US008576581B2

(12) United States Patent
Caubert et al.

(10) Patent No.: US 8,576,581 B2
(45) Date of Patent: Nov. 5, 2013

(54) CIRCUIT FOR CONTROLLING THE CURRENT IN AN ELECTRICAL CONTROL MEMBER OR THE VOLTAGE ACROSS THE TERMINALS OF SAID ELECTRICAL CONTROL MEMBER

(75) Inventors: Guillaume Caubert, Paris (FR); Dominique Dupuis, Bruyeres sur Oise (FR); Julien Horbraiche, Chevrieres (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 587 days.

(21) Appl. No.: 12/745,845

(22) PCT Filed: Dec. 4, 2008

(86) PCT No.: PCT/FR2008/001695
§ 371 (c)(1),
(2), (4) Date: Jun. 29, 2010

(87) PCT Pub. No.: WO2009/101292
PCT Pub. Date: Aug. 20, 2009

(65) Prior Publication Data
US 2010/0270998 A1 Oct. 28, 2010

(30) Foreign Application Priority Data

Dec. 7, 2007 (FR) ...................................... 07 08562

(51) Int. Cl.
*H02M 3/335* (2006.01)
(52) U.S. Cl.
USPC ......................................... 363/17; 363/56.02
(58) Field of Classification Search
USPC ...................... 363/56.02, 58, 98, 136, 15–17,
363/55–56.05, 95, 97, 131–132
See application file for complete search history.

(56) References Cited

U.S. PATENT DOCUMENTS 7,283,379 B2 * 10/2007 Baker et al. ...................... 363/98
7,365,508 B2 * 4/2008 Iribe et al. ................. 318/568.12
(Continued)

FOREIGN PATENT DOCUMENTS

DE 197 04 089 A1 8/1998
DE 103 28 623 A1 1/2005
(Continued)

OTHER PUBLICATIONS

International Search Report issued in PCT/FR2008/001695, mailed on Jul. 10, 2009, with translation, 6 pages.

*Primary Examiner* — Adolf Berhane
*Assistant Examiner* — Jeffrey Gblende
(74) *Attorney, Agent, or Firm* — Osha Liang LLP

(57) ABSTRACT

The present invention relates to a circuit (300) for controlling the current in an electrical control member (110) comprising a bridge provided with four terminals (105, 106, 107, 108) and comprising four control switches (AH, AL, BH, BL), a power source (109), PWM control means for at least two of the four switches. The control circuit exhibits a first state in which said first (AH) and fourth (BL) switches are closed and said second (BH) and third (AL) switches are open, a second state in which said second (BH) and third (AL) switches are closed and said first (AH) and fourth (BL) switches are open and at least one of the following two states: a third state in which said third (AL) and fourth (BL) switches are closed and said first (AH) and second (BH) switches are open and/or a fourth state in which said first (AH) and second (BH) switches are closed and said third (AL) and fourth (BL) switches are open. A particularly interesting application of the invention lies in the field of controlling the current for the actuators used for "camless" systems in motor vehicles.

23 Claims, 19 Drawing Sheets

(56) References Cited

U.S. PATENT DOCUMENTS

| | | |
|---|---|---|
| 2004/0239401 A1 | 12/2004 | Liao |
| 2005/0195622 A1* | 9/2005 | Lehman et al. .................. 363/17 |
| 2005/0276581 A1 | 12/2005 | Furuki |
| 2006/0221648 A1* | 10/2006 | Liu ................................ 363/17 |
| 2007/0297205 A1* | 12/2007 | Chen et al. .................... 363/132 |
| 2008/0037291 A1* | 2/2008 | Fukumoto ....................... 363/17 |

FOREIGN PATENT DOCUMENTS

| | | |
|---|---|---|
| WO | 03/065561 A1 | 8/2003 |
| WO | WO 2007014875 A2 * | 2/2007 |

* cited by examiner

PRIOR ART

PRIOR ART

CIRCUIT FOR CONTROLLING THE CURRENT IN AN ELECTRICAL CONTROL MEMBER OR THE VOLTAGE ACROSS THE TERMINALS OF SAID ELECTRICAL CONTROL MEMBER

FIELD OF THE INVENTION

The present invention relates to a circuit for controlling the current in an electrical control member or the voltage across the terminals of said electrical control member. A particularly interesting application of the invention lies in the field of controlling the current or electrical machines with variable inductance such as the actuators used for the so-called electromagnetic valves ("camless" system) in motor vehicles.

BACKGROUND OF THE INVENTION

The electromagnetic actuation of the valves requires electrical energy. This electrical energy is taken from the network on board the vehicle. The performance of the electromagnetic valve system involves minimizing the electrical energy consumption on the on-board network. In practice, the power available at the output of the crankshaft is equal to the total power developed by the heat engine minus the power needed for the correct operation of its auxiliaries (actuation of the valves, driving of the water and oil pumps, etc).

Generally, a positive- or negative-current-controlled electrical machine is often controlled by H-configuration power bridges, also called "four quadrant" bridges (or "full-bridge chopper") that are single-phase or polyphase depending on the structure of the machine. The term "four quadrant" bridge should be understood to mean a bridge control that works on all the quadrants of the voltage-current characteristic. Generally, the control electronics slave the current to a set point by applying, to the power bridges, a PWM (pulse width modulation) type control with fixed frequency. An example of the electronic structure of a "four-quadrant" bridge $1$ is represented in FIG. 1. The bridge $1$ comprises:

four terminals $5$, $6$, $7$ and $8$,
a DC voltage source $9$ (this may be, for example, a battery, a DC-DC power converter or an AC-DC power converter) connected to the first and second terminals $5$ and $6$ of the bridge $1$,
an electrical control member $10$ (such as an electrical load with variable inductance) used to control an actuator and connected between the third and fourth terminals $7$ and $8$ of the bridge circuit $1$,
a first switch $C_1$ connected between the first and third terminals $5$ and $7$,
a second switch $C_2$ connected between the first and fourth terminals $5$ and $8$,
a third switch $C_3$ connected between the second and third terminals $6$ and $7$,
a fourth switch $C_4$ connected between the second and fourth terminals $6$ and $8$.

The bridge $1$ therefore comprises two legs B1 and B2 respectively formed by the switches $C_1$ and $C_3$ in series and by the switches $C_2$ and $C_4$ in series.

The power switches $C_1$ and $C_4$ may be MOSFET (metal oxide semiconductor field effect transistor) transistors or IGBT (insulated gate bipolar transistor) transistors.

The technique most commonly used for its robustness is controlling the average current by using a control of the switches by pulse width modulation (PWM). Its greatest advantage is its immunity to noise. In practice, the regulation loop does not need an instantaneous current but a filtered value. This filtering introduces a delay which can prove highly restrictive when a high bandwidth is sought. In the case of a "camless" system actuator, the value supervisor calculates a voltage set point V* which must be applied to the terminals of the magnetic circuit. The pulse width modulation strategy translates the voltage set point into an instruction to close/open the electronic switches of the power electronics (in this case four of them). The power electronics apply the commands of the PWM strategy while observing its own constraints (management of dead times, whole times, etc). If $Sc_i$ is used to denote the switching function of the switch $C_i$, we obtain:

$$Sc_i = \begin{cases} 0 \text{ if } C_i \text{ is open} \\ 1 \text{ if } C_i \text{ is closed} \end{cases}$$

The controls for two switches of one and the same bridge leg ($C_i$ and $C_{i+2}$) are antagonistic to avoid causing a power supply short circuit. It is thus sufficient to give the trend over time of two switching functions (one for each leg) to determine the voltage $U_{act}$ at the terminals of the magnetic circuit $10$ according to the DC voltage $U_{DC}$. For convenience, the switching functions of the high switches are routinely chosen. By neglecting the voltage drop in the conducting elements and the switch opening and closing times, the following can be deduced:

$$U_{act} = (Sc_1 - Sc_2) \cdot U_{DC}$$

In the interests of simplicity, the time trends of the switching functions $Sc_1$ and $Sc_2$ are determined by comparing the value of the standardized voltage set point v* to a single triangular carrier $V_p(t)$ of frequency $f_{PWM}$. The triangular function may be any function that takes values between a minimum value $V_{pmin}$ and a maximum value $V_{pmax}$. The value of the standardized set point voltage v* is then:

$$v^* = \frac{V_{pmax} - V_{pmin}}{2 \cdot U_{DC}} \cdot (V^* - U_{DC}) + V_{pmax}$$

By defining the function sign(x) by:

$$\text{sign}(x) = \begin{cases} 0 \text{ if } x \leq 0 \\ 1 \text{ if } x > 0 \end{cases}$$

the switching function $Sc_1(t)$ is determined as being:

$$Sc_1(t) = \text{sign}(v^* - V_p(t))$$

The function $Sc_2(t)$ is the complementary function of $Sc_1(t)$ that can also be calculated by the following formula:

$$Sc_2(t) = \text{sign}(V_p(t) - v^*)$$

FIG. 2 graphically represents the determination of the switching functions $Sc_1(t)$ and $Sc_2(t)$. Thus, the first curve represents the trend as a function of time of the standardized set point voltage v* and of the triangular carrier $V_p(t)$. From this, the second curve is deduced, representing the trend of $Sc_1$ as a function of time and the third curve, complementing the second, representing $Sc_2$ as a function of time. The fourth curve represents the trend of the voltage $U_{act}$ across the terminals of the magnetic circuit $10$ which varies from $+U_{DC}$ to $-U_{DC}$ and has an average value V* over a chopping period $f_{PWM}$. Since the voltage $U_{act}$ can take only two distinct values, this is referred to as a two-state PWM strategy.

FIG. 3 illustrates the switchovers induced by this type of PWM strategy on a four-quadrant bridge 11 comprising four switches AH, BH, AL and BL respectively identical to the transistors C2, C1, C4 and C3 of the bridge 1 as represented in FIG. 1 for the control of a load 10.

The bridge 11 has two possible states:
a magnetization state (with a voltage $V_L = +U_{dc}$ applied to the actuator) in which the switches BH and AL are closed and the switches AH and BL are open,
a demagnetization state (with a voltage $V_L = -U_{dc}$ applied to the actuator) in which the switches BH and AL are open and the switches AH and BL are closed.

Implementing such PWM control for a four-quadrant bridge does, however, raise certain difficulties.

A first difficulty relates to the switching losses. When a switch changes state (transition from open to closed or transition from closed to open), it originates losses due to the simultaneous presence of current passing through it and a voltage at its terminals. The energy then dissipated depends on the value of the chopped current $I_{act}$, of the DC voltage $U_{DC}$ and of the speed of switching (the switching times are, for example, set by the value of the gate resistance of the MOSFET transistors used). Thus, for each chopping period, there are two openings and two closures regardless of the direction of the current on one of the two switches of each of the bridge lengths. This double switching for each chopping period obviously causes losses that become all the greater as the frequency increases. It will be noted that it is important to reconcile efficiency and bandwidth. In the case of PWM control, the PWM frequency is generally some tens or even hundreds of kilohertz. At these high frequencies, the switching losses predominate over the other conduction losses. It will be noted that, in the transition from a magnetization state to a demagnetization state, of the four switching operations for each chopping period, two are hard switching operations and two are soft switching operations: in other words, the first step is to open the two transistors that are initially closed (hard switchovers) then, after a dead time, the two initially open transistors are closed (soft switchovers). Having two switches of one and the same leg closed simultaneously is thus avoided. During the dead time (before the soft switchovers), the diodes (called "freewheeling") intrinsic to the MOSFET switches conduct and thus make it possible to keep the MOSFET potential close to zero during the soft switchover.

Moreover, the repeated switchovers do not only affect the efficiency of the control electronics, but also the efficiency of the electrical machine that they drive. The chopping of the voltage generates high-frequency harmonics which induce losses in the electrical machines. These electrical machines generally consist of magnetic materials that favor eddy currents (iron-Si for example). The induction generates an induced voltage in the plates which, depending on their resistivity, creates often significant eddy currents. Although the plates are finely cut and insulated from one another, the currents that flow therein generate losses through the Joule effect. As mentioned above, the fourth curve of FIG. 2 represents the voltage $U_{act}$ across the terminals of the load 10 as represented in FIG. 1 with a voltage source 9 having a value $U_{DC}$. The control of the bridge is of PWM type with a duty cycle $\alpha$. The voltage $U_{DC}$, disregarding the voltage drops due to the resistances of the switches, is applied to the load 10. Whatever the duty cycle, if the latter is constant, the effective value ($U_{eddy}$) of the voltage applied to the load 10 is equal to the voltage $U_{DC}$ (which represents the peak voltage of the voltage $U_{act}$): $U_{eddy} = U_{DC}$. Finally, the losses generated by the eddy current whose frequencies are above the chopping frequency and for which a constant duty cycle can be considered, are substantially proportional to the peak voltage: $P_{eddy} = k \cdot U_{eddy} = k \cdot U_{DC}$.

Furthermore, the control of electronics, and more particularly their switches, generate high-frequency common mode currents because of the chopping. The load generally has a capacitive coupling relative to earth. For example, in the case of a wound electrical machine, there is a significant coupling between the winding subjected to the common mode voltage and the frame linked to earth. Common mode currents are thus generated and they are looped by the power supply. These high-frequency current loops are responsible for the electromagnetic radiation that is likely to have an impact in terms of compliance with current EMC (electromagnetic compatibility) standards.

SUMMARY OF THE INVENTION

In this context, the present invention aims to provide a "four quadrant" bridge circuit for controlling the current in an electrical control member or the voltage across the terminals of said control member, said circuit providing an economical way of reducing the switching losses in the power switches, reducing the losses associated with the eddy currents in the magnetic circuit and obviating the abovementioned EMC issues.

To this end, the invention proposes a circuit for controlling the current in an electrical control member or the voltage across the terminals of said electrical control member, said circuit comprising:
a bridge provided with four terminals and comprising four control switches,
a power source for said bridge,
means of controlling at least two of said four switches by pulse width modulation,
said power source being connected between a first terminal and a second terminal of said bridge,
said electrical control member being connected between a third terminal and a fourth terminal of said bridge,
the first switch being connected between said first terminal and said third terminal of said bridge,
the second switch being connected between said first terminal and said fourth terminal of said bridge,
the third switch being connected between said third terminal and said second terminal of said bridge,
the fourth switch being connected between said fourth terminal and said second terminal of said bridge,
said control circuit being characterized in that it exhibits:
a first state in which said first and fourth switches are closed and said second and third switches are open,
a second state in which said second and third switches are closed and said first and fourth switches are open,
at least one of the following two states:
a third state in which said third and fourth switches are closed and said first and second switches are open,
a fourth state in which said first and second switches are closed and said third and fourth switches are open;
said pulse width modulation control means authorizing:
the transition from said first state to at least one of said third or fourth states,
the transition from said second state to at least one of said third or fourth states,
the transition from at least one of said third or fourth states to said first state,
the transition from at least one of said third or fourth states to said second state.

By virtue of the invention, the control circuit can be used to manage three or four states of the "four quadrant" bridge (i.e., the circuit can be used to switch to three or four different states) controlled by a PWM strategy. The proposed PWM strategy is said to be three-state because the voltage $V_L$ applied to the terminals of the load (electric control member) is based on three levels: $-U_{DC}$, 0 and $U_{DC}$ (in which $U_{DC}$ designates the voltage delivered by the power source). The introduction of a third state saves on one hard switchover (and one soft switchover). In order to avoid a direct transition between the "magnetization" state and the "demagnetization" state which leads two hard switchovers, the circuit according to the invention allows for a transition from the "magnetization" state to a so-called "freewheeling" state (corresponding to either of the third or fourth states) and a transition from the "demagnetization" state to a "freewheeling" state. The number of switchovers can therefore be reduced by a factor of two. Such a reduction has significant consequences on the dimensioning of the power electronics and allows for:

- an improvement in the reliability of the existing power electronics;
- a miniaturization of the components used;
- a reduction in costs.

Moreover, regarding the losses through eddy currents, the effective value is very different between a conventional control of a four-quadrant bridge which switches the bridge to two states and the control proposed according to the invention which switches the bridge between three or four states. The three- or four-state control applies less voltage to control the same current, in other words to supply the same mean voltage.

Furthermore, as stated above, the actuator controlled by the electrical member has a spurious capacitance relative to the frame. The chopping of the voltage generates high-frequency harmonics in the control electronics which return via earth. These are common-mode disturbances. EMC standards limit this noise level. According to the invention, the voltage generated by the three-state control generates fewer harmonics than the two-state control. A reduction of 6 dB in the common-mode currents is thus achieved.

The system according to the invention can also exhibit one or more of the characteristics below, considered individually or in all technically possible combinations.

Advantageously, said pulse width modulation control means authorize:

- a first so-called negative alternation phase comprising transitions from said first state to said third state and transitions from said third state to said first state, said first and third switches forming a first leg, called amplitude leg, switching at a so-called chopping frequency, and said second and fourth transistors forming a second leg, called sign leg, being respectively closed and open,
- a second so-called positive alternation phase comprising transitions from said second state to said fourth state and transitions from said fourth state to said second state, said first and third switches switching at said so-called chopping frequency and said second and fourth switches being respectively open and closed.

the switching of said second and fourth switches of said sign leg ensuring the transition between said negative and positive alternations at a frequency below said chopping frequency.

Advantageously, the control circuit according to the invention comprises a shunt resistor connected in series between said electrical control member and said fourth terminal.

In this case, the control circuit preferentially comprises an operational amplifier, the terminals of said shunt resistor forming the inverting and non-inverting inputs of said operational amplifier.

Advantageously, the control circuit according to the invention comprises:

- a charge pump capacitor which, when charged, is suitable for delivering a control voltage for said second switch;
- a second power source delivering a voltage less than the voltage delivered by said first voltage source, said second voltage source being suitable for charging said charge pump capacitor when said fourth switch is closed;
- means for forcing the transition from said fourth state to said third state when said control circuit is in a positive alternation phase so that said charge pump capacitor is recharged via said second power source.

According to a first embodiment, said control means comprise:

- means for generating a pulse width modulation signal having a duty cycle $\alpha$;
- means for applying said pulse width modulation signal having a duty cycle $\alpha$ to said third transistor and a pulse width modulation signal having a duty cycle $1-\alpha$ to said first transistor;
- means for passing between the positive alternation and the negative alternation implementing the following state machine:
  - when said bridge is in its positive alternation and the duty cycle $\alpha$ is cancelled, the machine detects a change of state and changes to negative alternation.
  - When said bridge is in its negative alternation and the duty cycle $\alpha$ is equal to 100%, the machine detects a change of state and changes to positive alternation.

Advantageously, said power source delivers a DC voltage $+U_{DC}$, said control circuit comprising:

- means for applying an average voltage equal to the product $\alpha \times U_{DC}$ to said electrical control member during said positive alternation;
- means for applying an average voltage equal to $(\alpha-1) \times U_{DC}$ to said electrical control member during said negative alternation.

According to a second embodiment, said control means comprise:

- means for generating a pulse width modulation signal having a duty cycle $\alpha$;
- means for converting said pulse width modulation signal having a duty cycle $\alpha$ into a pulse width modulation signal having a duty cycle $\alpha'=|2\alpha-1|$;
- means for applying said pulse width modulation signal having a duty cycle $\alpha'$ to said third transistor (AL) and a pulse width modulation signal having a duty cycle $1-\alpha'$ to said first transistor (AH) during said positive alternation;
- means for applying said pulse width modulation signal having a duty cycle $1-\alpha'$ to said third transistor (AL) and a pulse width modulation signal having a duty cycle $\alpha'$ to said first (AH) transistor during said negative alternation;
- means for passing between the positive alternation and the negative alternation implementing the following state machine:
  - when said bridge is in its positive alternation and said duty cycle $\alpha$ is strictly less than 50%, the machine detects a change of state and changes to negative alternation.
  - When said bridge is in its negative alternation and said duty cycle $\alpha$ is greater than or equal to 50%, the machine detects a change of state and changes to positive alternation.

Advantageously, said power source delivers a DC voltage +$U_{DC}$, said control circuit comprising means for applying an average voltage equal to the product $(2\alpha-1)\times U_{DC}$ to said electrical control member during said positive alternation and during said negative alternation.

Advantageously, said means for converting said pulse width modulation signal having a duty cycle $\alpha$ into a pulse width modulation signal having a duty cycle $\alpha'=|2\alpha-1|$ comprise:

means for performing the subtraction between a signal of duty cycle equal to 50% and said signal of duty cycle $\alpha$;
means for doubling the signal obtained by said subtraction.

Preferentially, said means for performing the subtraction between a signal of duty cycle equal to 50% and said signal of duty cycle $\alpha$ are means performing an exclusive OR logic function having on its two inputs respectively said signal of duty cycle equal to 50% and said signal of duty cycle $\alpha$.

Preferentially, said means for doubling the signal obtained by said subtraction comprise at least one counter.

Advantageously, said control means are included in a programmable logic circuit.

Advantageously, said switches are MOSFET transistors.

Another subject of the present invention is a use of the control circuit according to the invention for an electrical member formed by an inductive load with variable inductance.

Advantageously, the electrical member is contained in an actuator provided with an actuated part, said electrical member controlling said actuated part displacement-wise.

Preferentially, said actuator is an electromagnetic valve actuator for a motor vehicle.

BRIEF DESCRIPTION OF THE DRAWINGS

Other features and advantages of the invention will emerge clearly from the description given below, by way of indication and in a nonlimiting manner, with reference to the appended figures, in which.

DETAILED DESCRIPTION

In all the figures, common elements are given the same reference numbers.

Figure 1:
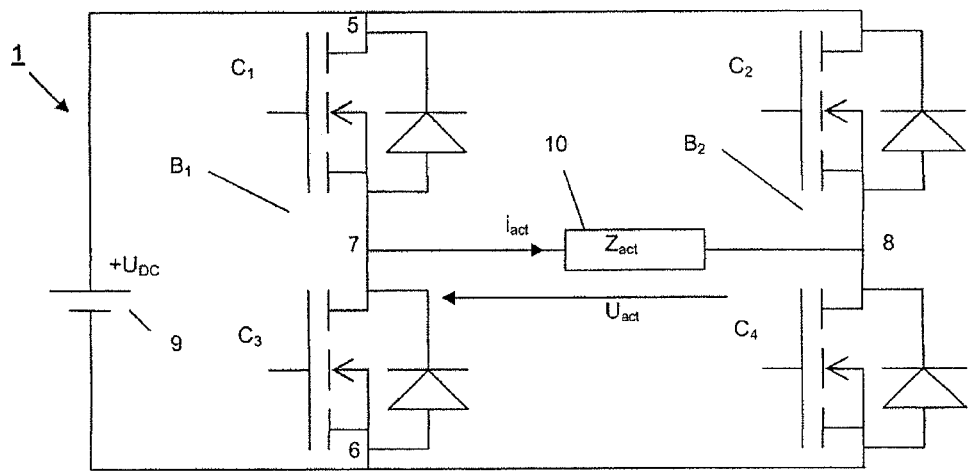
FIG. 1 is a simplified schematic representation of the electronic structure of a four-quadrant bridge illustrating the state of the art.
Figure 2:
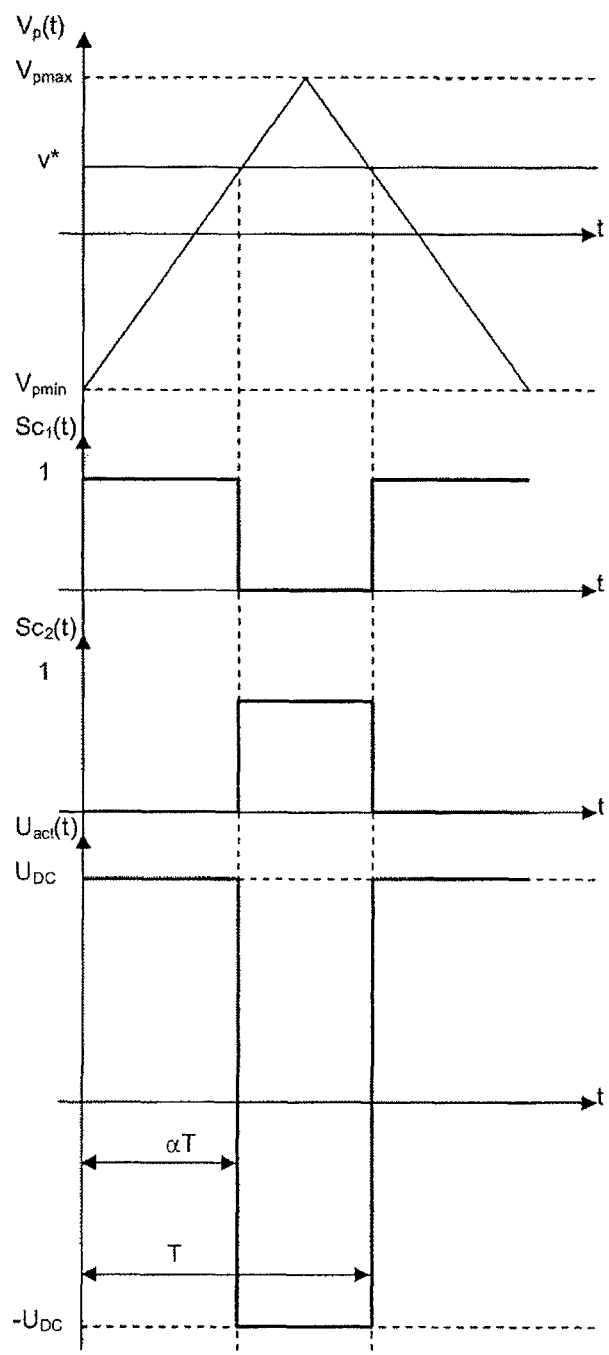
FIG. 2 graphically represents the determination of the switching functions $Sc_1(t)$ and $Sc_2(t)$ of the switches of a four-quadrant bridge as represented in FIG. 1.
Figure 3:
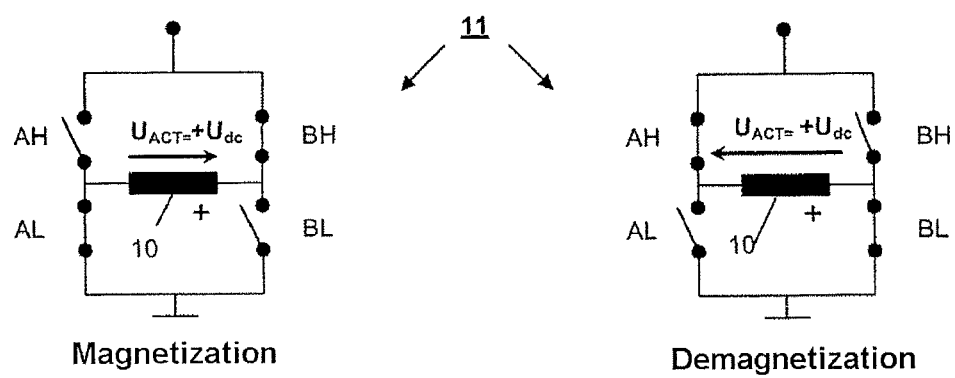
FIG. 3 illustrates the switchover induced by a PWM strategy according to the state of the art on a four-quadrant bridge.

FIGS. 1 to 3 have already been described above with reference to the prior art.

Figure 4:
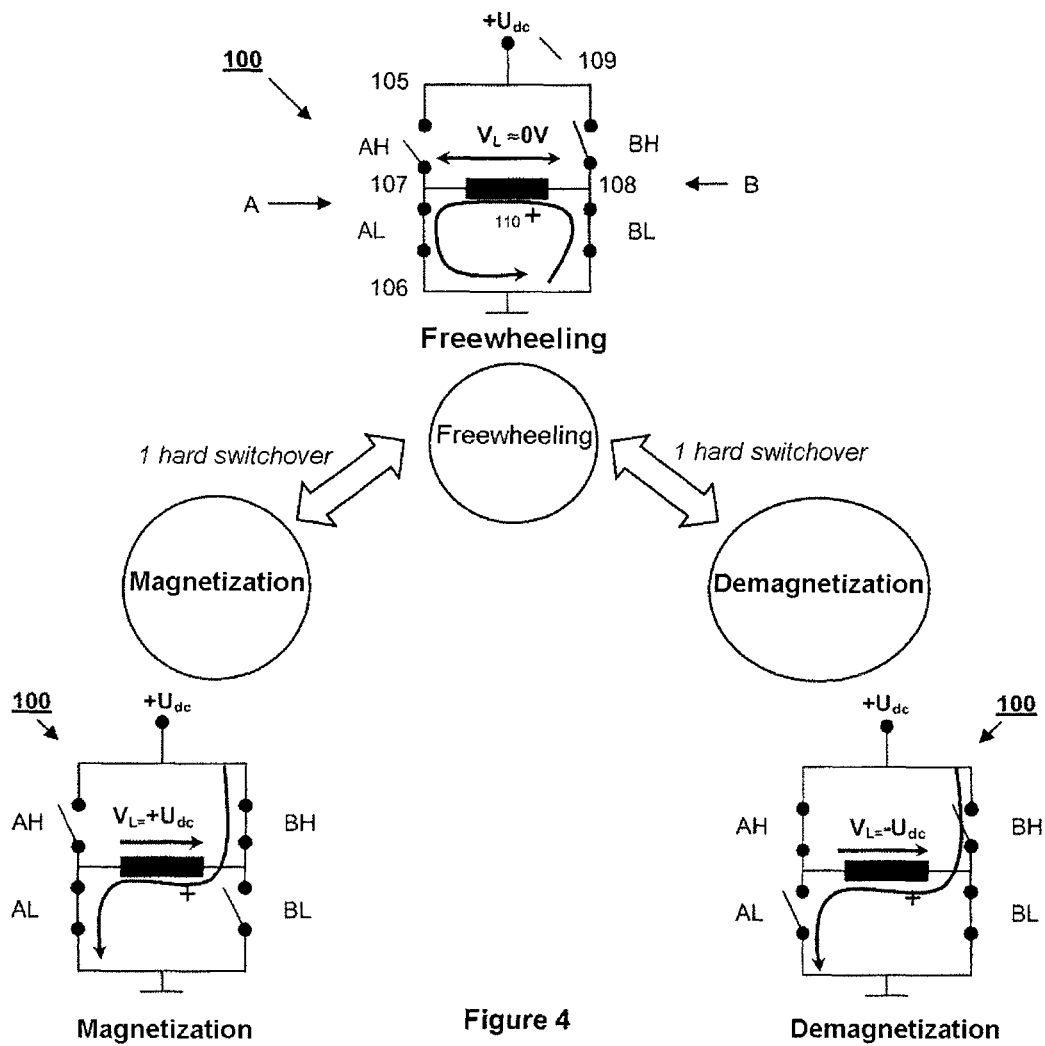
FIG. 4 illustrates the states of a control circuit according to a first embodiment of the invention.

FIG. 4 illustrates the three states of a control circuit 100 according to the invention.

The circuit 100 comprises:

four terminals 105, 106, 107 and 108, a DC voltage source 109 delivering a voltage +$U_{DC}$, for example, a battery or a DC-DC power converter (or an AC-DC power converter) connected to the first and second terminals 105 and 106 of the bridge 1, an electrical control member 110 such as an inductive load for controlling an actuator and connected between the third and fourth terminals 107 and 108, a first switch AH connected between the first and third terminals 105 and 107, a second switch BH connected between the first and fourth terminals 105 and 108, a third switch AL connected between the second and third terminals 106 and 107, a fourth switch BL connected between the second and fourth terminals 106 and 108.

The power switches AH, BH, AL and BL are, for example, MOSFET transistors. Each transistor has an antiparallel-mounted diode (present through construction in the case of MOSFET transistors).

"Leg A" will hereinafter be used to denote the leg comprising the switches AH and AL in series and "leg B" will be used to denote the leg comprising the switches BH and BL in series.

The electrical control member (also called load hereinbelow) 110 is in this case a variable inductance used to control an actuator (electromagnet) for electromagnetic valves. The variable inductance is obviously not perfect and includes a resistive part. The current in the electrical control member 110 is used, for example, to control the opening and closing of the valves (via paddles which hold the valves in the open or closed position). The position of the valves is defined by a set point corresponding to a set point current.

Three states (respectively: magnetization, freewheeling and demagnetization) are represented in FIG. 4:

- the magnetization state corresponds to the case in which the transistors BH and AL are closed and the transistors AH and BL are open: in this case, the voltage $V_L$ applied to the terminals of the load 110 has the value $+U_{DC}$;
- the freewheeling state corresponds to the state in which the transistors AL and BL are closed and the transistors AH and BH are open: this state will hereinafter be called "low" freewheeling state in contrast to another freewheeling state not represented here, called "high" freewheeling state, in which the transistors AH and BH are closed and the transistors AL and BL are open. In the case of high or low freewheeling, the voltage $V_L$ applied to the terminals of the load 110 has the value 0.
- the demagnetization state corresponding to the case in which the transistors AH and BL are closed and the transistors and AL and BH are open: in this case, the voltage $V_L$ applied to the terminals of the load 110 has the value $-U_{DC}$.

The benefit of introducing these three (or four) states is that they provide a way of reducing the number of switchovers in each period. The transition from the magnetization state to the demagnetization state (and vice versa) requires two switchovers whereas a transition from the magnetization state or the demagnetization state to a freewheeling state (high or low) requires just one switchover. In practice, in the first case, the two legs switch simultaneously whereas, in the other case, only one leg switches. We will see hereinbelow that it is advantageous to use the two low and high freewheeling states; however, these two states (high and low freewheeling) fulfill the same function and it is also possible to use only one of the two freewheeling states: this configuration is illustrated in FIG. 4 since only the low freewheeling state is used.

In order to save on the number of switchovers, there is never any direct transition between the magnetization state and the demagnetization state. Thus, for a given frequency, it is possible to reduce the number of switchovers by two.

Figure 5:
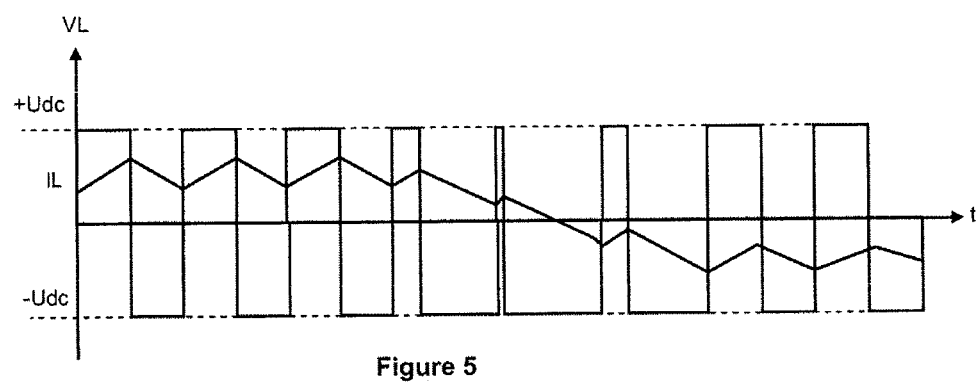
FIGS. 5 and 6 illustrate the trend as a function of time of the voltage applied to the terminals of a load such as the load of FIG. 4 and of the current in this load, respectively in the case of a PWM control according to the state of the art using two states and in the case of a control circuit according to the invention using three states.
Figure 6:
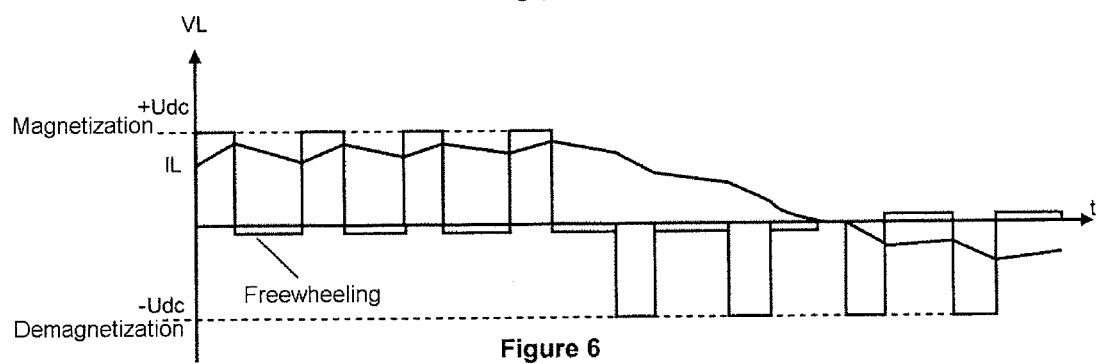

FIGS. 5 and 6 illustrate the trend of the voltage VL applied to the terminals of a load such as the load 110 of FIG. 4 and of the current IL in this load, respectively in the case of a PWM control according to the state of the art using two states and in the case of a control circuit according to the invention using three states.

It can be seen that maintaining a positive or negative current IL in the load entails, in the case of a two-state control, working on two quadrants (positive and negative voltage alternations $+U_{DC}$ and $-U_{DC}$ respectively corresponding to the magnetization and demagnetization states) whereas the same control of the current with three states makes it possible to work essentially on just one quadrant (positive or negative voltage alternations, depending on whether it is a positive or negative current that is being controlled, and almost zero voltages corresponding to the freewheeling state).

It will be noted that, in the configuration illustrated in FIG. 4, only the low freewheeling state is used and the two legs A and B switch at the frequency of the PWM control (typically several tens or even hundreds of kHz).

Figure 7:
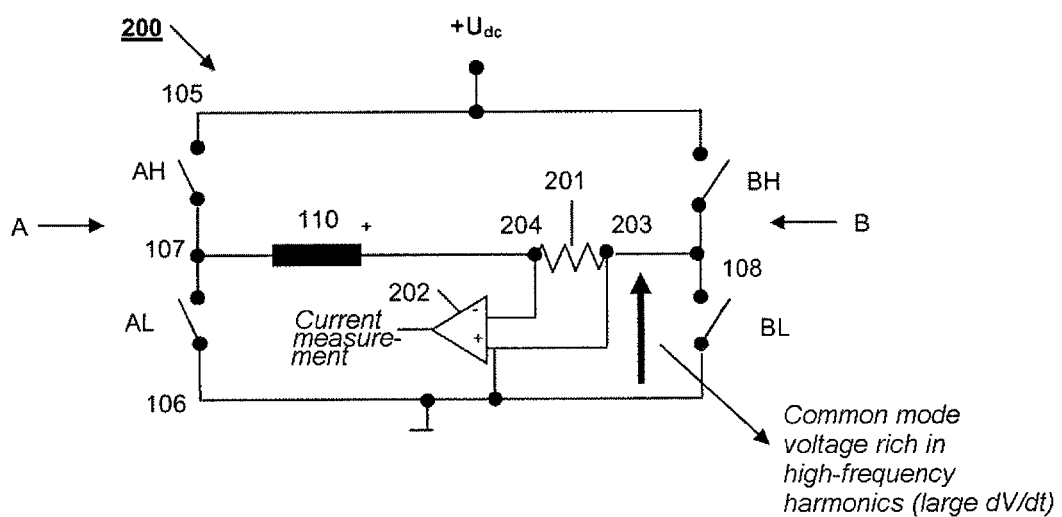
FIG. 7 represents a circuit for directly measuring the load current.

Such a configuration can lead to a few common mode disturbances on the direct load current measurement. We will first briefly describe, with reference to FIG. 7, a circuit 200 for performing such a measurement.

The circuit 200 comprises, in addition to the components already described above with reference to FIG. 4, a shunt resistor 201 in series with the load 110, said shunt resistor having a terminal 203 linked to the terminal 108 of the circuit 200 and to the non-inverting input of an operational amplifier 202 and a terminal 204 linked to the load 110 and to the inverting input of the operational amplifier 202.

The advantage of taking a current measurement directly on the load when implementing an average current control is that there is no need to reconstruct the current to obtain the image of the average current. Also, since the shunt resistor is an inexpensive solution, the use of an operational amplifier accepting high common mode voltages is of interest. It is thus possible to have a measurement referenced relative to ground. On the other hand, the phase undergoes strong potential variations relative to the ground. This is why a high common mode rejection ratio (high CMRR) is necessary in order to have a measurement that is not noise-affected at the output of the amplifier. A filtering of the measurement can reduce the common mode noise but it also handicaps the bandwidth or stability. When it is essential to have a high bandwidth and it is necessary to have rapid switchovers, it may be difficult to have a specific measurement.

Thus, by using the circuit 200 with a two-state PWM control, the measurement of the current is noise-affected by peaks due to the common mode at each switchover of the switches which disturbs the regulation of the current.

A solution for obviating this problem consists in organizing the sequencing of the four possible states (magnetization, demagnetization, high freewheeling, low freewheeling) so that the leg bridge (in this case the leg B) linked to the current measuring shunt resistor 201 does not switch at the chopping frequency.

Figure 8:
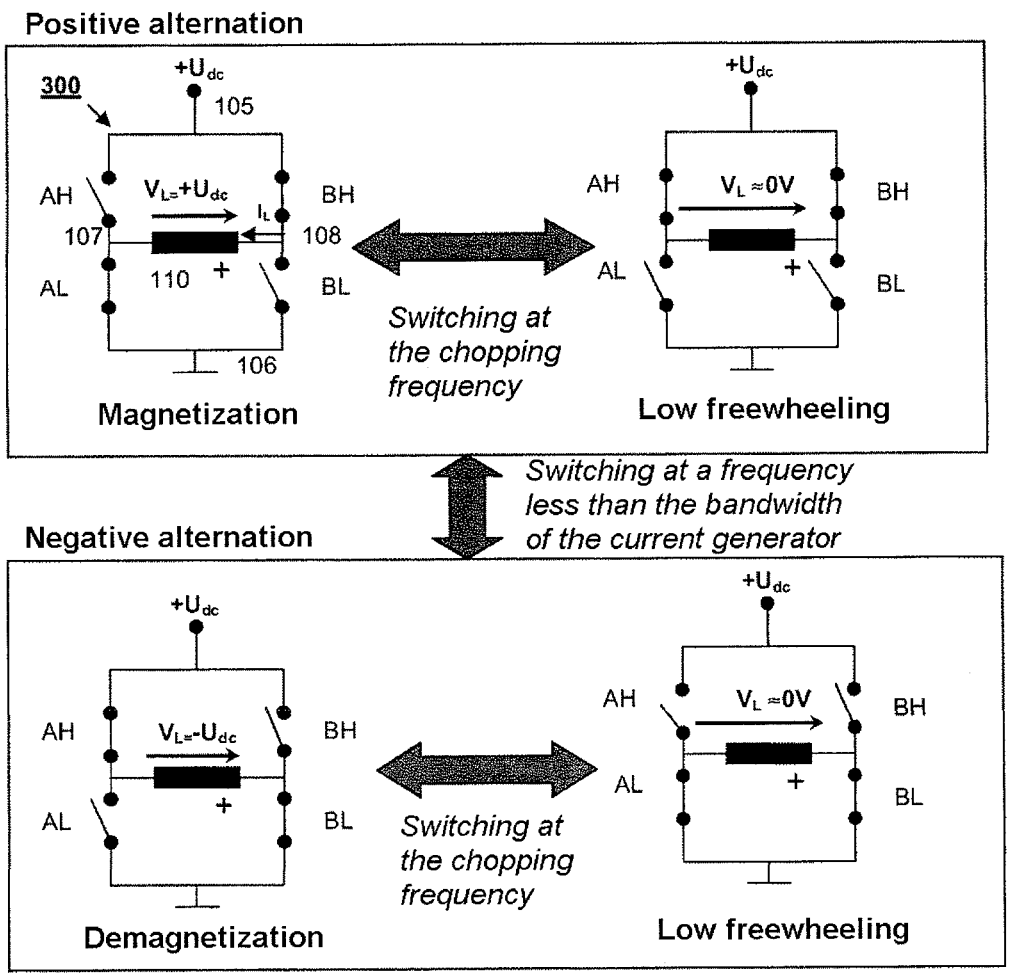
FIG. 8 represents the states of a control circuit according to a second embodiment of the invention.

This solution is illustrated by FIG. 8 which represents the sequencing of the four states of a control circuit 300 formed by components identical to those of the circuit 100 represented in FIG. 4.

Hereinafter in the text, we will distinguish between two macroscopic states of the four-quadrant control circuit 300:

- The term "positive alternation" applies when the control circuit 300 switches the switches AH, AL, BH and BL so that the mean voltage observed by the load 110 is positive. It will be noted that a positive mean voltage leads to a positive current $I_L$ in the load.
- The expression "negative alternation" applies when said control circuit switches the switches so that the mean voltage observed by the load 110 is negative. It will be noted that a positive mean voltage leads to a positive current $I_L$ in the load.

The positive alternation is obtained by switching only the leg A switches AH and AL, the leg B switches always remaining in the same state (BH closed and BL open); there is thus a transition in the case of the positive alternation from a magnetization state (AH open and AL closed) to a high freewheeling state (AH closed and AL open), the transition between the two states occurring at the chopping frequency (typically several tens or even hundreds of kHz). Thus, during the positive alternation, only the leg A switches at high frequency (chopping frequency), the leg B not switching.

The transition from the positive alternation to the negative alternation is obtained by switching the leg B (BH open and BL closed).

The negative alternation is obtained by switching only the leg A switches AH and AL, the leg B switches always remaining in the same state (BH open and BL closed); there is thus a transition in the case of the negative alternation from a magnetization state (AH closed and AL open) to a low freewheeling state (AH open and AL closed), the transition between the two states occurring at the chopping frequency (typically several tens or even hundreds of kHz). Thus, during the negative alternation, as during the positive alternation, only the leg A switches at high frequency (chopping frequency), the leg B not switching.

Whatever the ratio between the duration of the magnetization and low freewheeling states, the mean voltage observed by the load 110 is positive. This is why the term "positive alternation" is used to designate the switchover between these two states.

In the same way, regardless of the ratio between the duration of the demagnetization and freewheeling states, the mean voltage observed by the load 110 is negative. This is why the term "negative alternation" is used to designate the switchover between these two states.

By differentiating high freewheeling from low freewheeling, it is possible for the same alternation to switch just one leg of the control circuit 300.

During the positive alternation, the leg B (BH closed, BL open) does not switch, whereas the leg A switches at the chopping frequency. Similarly, during the negative alternation, the leg B (BH open, BL closed) does not switch whereas the leg A switches at the chopping frequency.

Thus, during the two alternations, the leg B does not switch. The switching of the leg B occurs only in the event of a change of alternation when the sign of the mean voltage applied to the load 110 changes. The switch between two alternations occurs at a frequency well below the chopping frequency and at a frequency below the bandwidth of the current regulation, theoretically two times smaller than the chopping frequency, but generally more than ten times smaller than the chopping frequency (usually a few kilohertz).

Consequently, it is possible to dedicate a leg of the bridge (in this case the leg A) to the high-frequency switching to regulate the amplitude (absolute value) of the voltage applied to the load and to dedicate the other leg (in this case the leg B) to the low-frequency switching for the polarity of the voltage applied to the load.

Hereinafter in the text, a distinction will be made between the amplitude leg (the leg A) for regulating the amplitude and the sign leg (the leg B) for the polarity of the voltage applied to the load.

The use of an amplitude leg and of a sign leg is of particular interest in a configuration in which the control circuit incorporates a shunt resistor.

Figure 9:
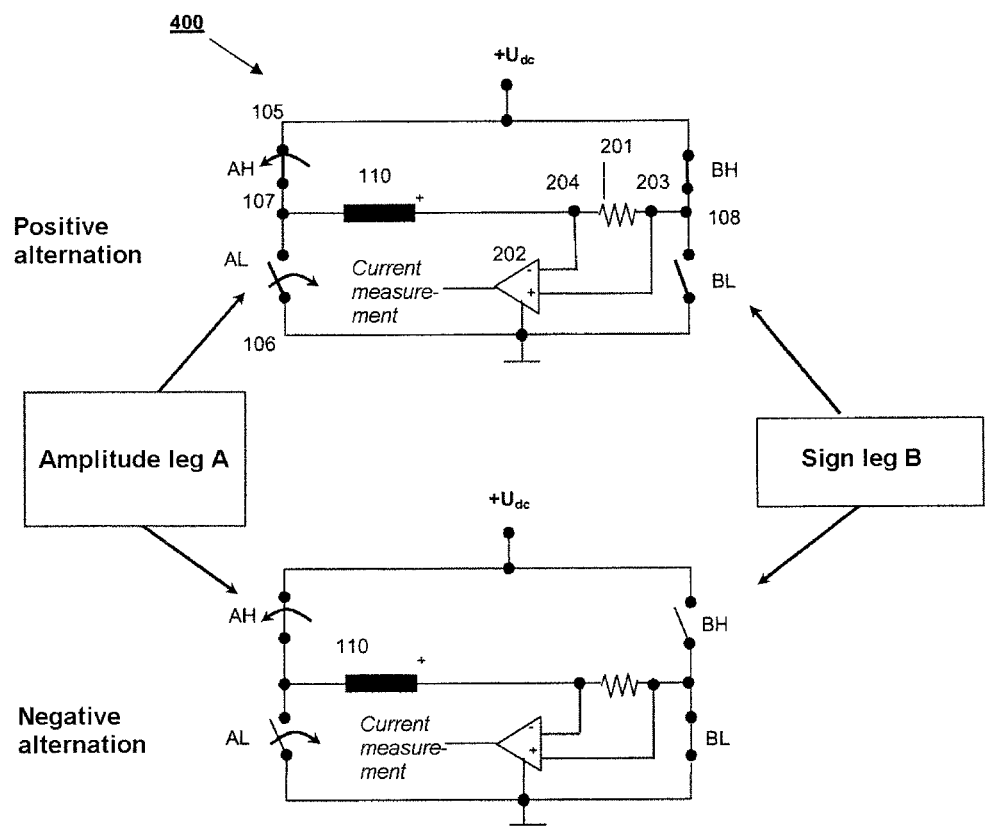
FIG. 9 illustrates the states of a control circuit according to a third embodiment of the invention incorporating a shunt resistor.

The positive and negative alternations of such a circuit 400 are illustrated in FIG. 9. The circuit 400, in addition to the components already described hereinabove with reference to FIG. 4, comprises a shunt resistor 201 in series with the load 110 with a terminal 203 linked to the terminal linked to the terminal 108 of the circuit 200 and to the non-inverting input of an operational amplifier 202 and a terminal 204 linked to the load 110 and to the inverting input of the operational amplifier 202. The leg A formed by the switches AH and AL is the amplitude leg which switches at the chopping frequency and is used to set the absolute value of the current in the load 110. The leg B formed by the switches BH and BL is the sign leg and is used to perform the transitions between the positive and negative alternations.

Figure 10:
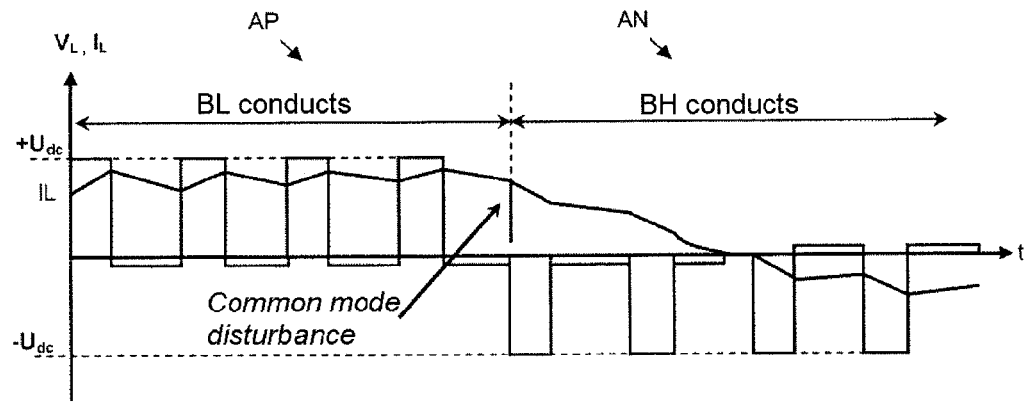
FIG. 10 illustrates the trend of the measured current and of the load current as a function of time for a circuit as represented in FIG. 9.

This configuration is of particular interest because the occurrence of the common mode disturbances is less than that of a two-stage configuration according to the prior art. The disturbance occurs only during the sign alternation. Physically, the change of sign occurs when the slope of the current is substantially reversed. FIG. 10 illustrates the operation according to the disembodiment: the voltage VL across the terminals of the load and the current IL measured in the load (via the shunt resistor 201 and the operational amplifier 202) are represented as a function of time. A positive alternation AP (during which BL conducts and BH is closed) is followed by a negative alternation AN (during which BH conducts and BL is closed). The common mode disturbance (current peak disturbing the measured current) occurs only at the moment of the change alternation. As indicated above, with a two-state configuration according to the prior art, we would observe a peak on each switchover.

Figure 11:
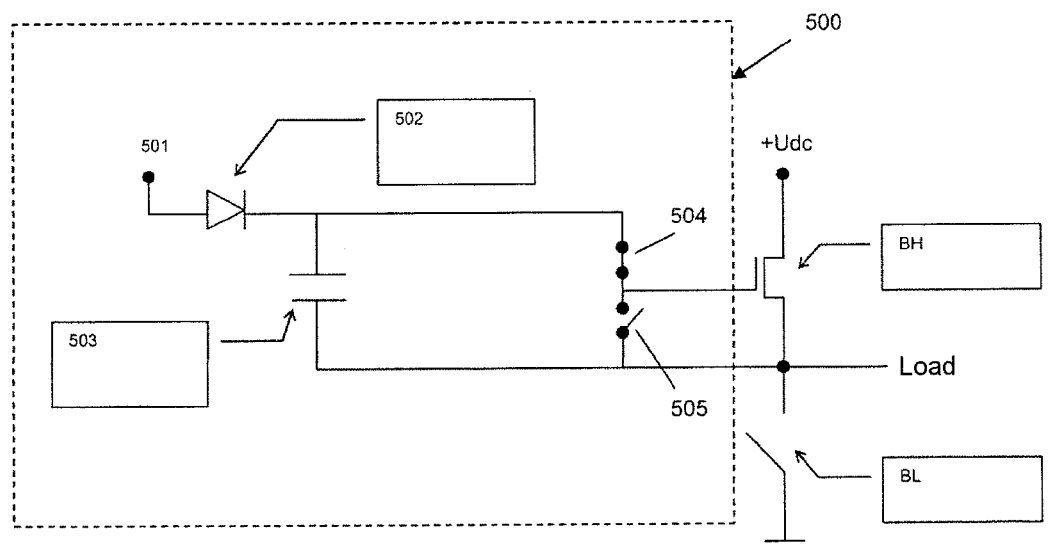
FIG. 11 represents a charge pump circuit of a switch used in a control circuit according to the invention.

It should be noted that the embodiment as described with reference to FIGS. 9 and 10 involves keeping one of the two transistors of the sign leg B constantly closed as long as there is no change of alternation: thus, the control of the closure of the transistor BH of the sign leg may be permanent in the case of regulation of a positive constant current. To keep a MOSFET or IGBT transistor in this closure state, a control voltage must be applied to its gate. One solution for applying a control voltage to a transistor consists in using a so-called charge pump technique. FIG. 11 illustrates a charge pump circuit 500 of a switch used in a control circuit according to the invention and which makes it possible to maintain a control voltage on the transistor BH (only leg B is represented in FIG. 11). The circuit 500 comprises:

an auxiliary power supply 501 delivering a voltage that is less (typically by the order of 12 to 15 V, these voltage values corresponding to typical values used to control the gate of a MOSFET transistor) than the voltage $U_{DC}$ from the main power source;

a diode 502, the anode of which is linked to the auxiliary power supply 501;

a capacitor 503 having a first terminal linked to the cathode of the diode 502 and a second terminal linked to the common terminal of the transistors BH and BL;

a first switch 504 having a first terminal linked to the cathode of a diode 502 and a second terminal linked to the gate of the transistor BH;

a second switch 505 having a first terminal linked to the second terminal of the first switch 504 and therefore to the gate of the transistor BH and a second terminal linked to the common terminal of the transistors BH and BL.

The capacitor 503 is charged by closing the transistor BL via the auxiliary power supply 501.

The charged capacitor 503 delivers a voltage controlling the gate of the transistor BH when the switch 504 is closed.

Now, the use of a charge pump technique to control the transistor BH does not make it possible to permanently maintain a voltage on the gate without a recharge. Thus, when the duration of a positive alternation exceeds a certain time (possible situation when regulating a positive current), the closure of the transistor BH of the sign leg can no longer be guaranteed because the capacitor 503 of the charge pump is discharged progressively into the gate of the transistor BH.

In order to avoid an unwanted opening of this MOSFET, one solution consists in forcing the closure of the transistor BL of the sign leg to guarantee the charging of the capacitor 503 of the charged pump.

In order to avoid disturbing the load control, the transition will take place during a high freewheeling state (zero mean voltage observed by the load) and the forced state will be a low freewheeling state (zero mean voltage observed by the load). The control of the load is not disturbed by such action since the high freewheeling and low freewheeling states are perfectly equivalent with respect to the load control. Thus, the recharging of the charge pump is an action that is transparent with respect to the load (electrical control member).

The capacitor 503 of the charge pump is thus recharged so as to maintain a sufficient control voltage on the transistor BH; for this, the sign leg goes back to a control of the transistor BL which enables the capacitor 503 to be recharged by the auxiliary power supply 501 through the diode 502 of the charge pump circuit 500.

We will, hereinbelow, describe two embodiments of a control with four states (of which two, high freewheeling and low freewheeling, are equivalent from the point of view of the load).

Figure 12:
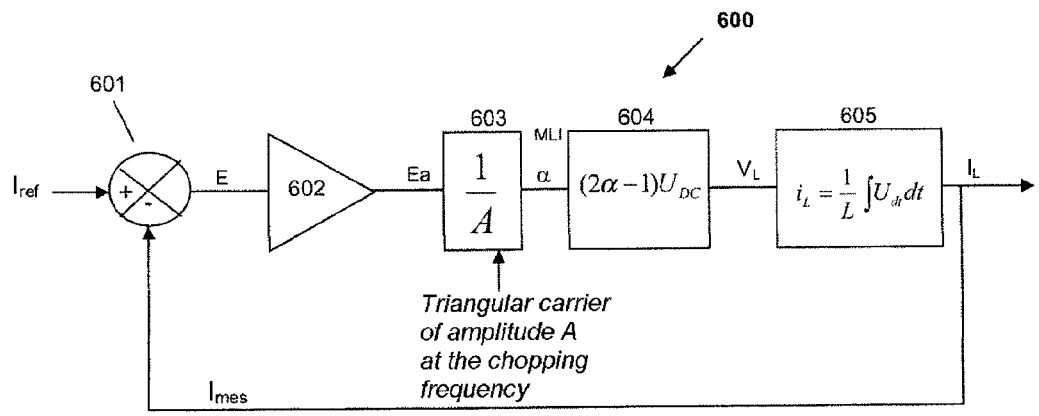
FIG. 12 represents a regulation loop used for a control circuit according to the prior art.

Before that, we will briefly review the operation of a regulation loop of a two-state control of a four-quadrant bridge; such a loop 600 is represented in FIG. 12. The loop 600 comprises:
  a subtractor 601;
  an amplifier 602;
  a generator 603 of PWM (pulse width modulation) signal having a duty cycle α;
  a four-quadrant bridge 604 intended to supply a chopped voltage to a load (generally an inductive load) 605, of which the measured current $I_{mes}$ forms the current to be locked by said loop 600.

The regulation loop 600 of a two-state control of the bridge 604 operates as follows: a current set point $I_{ref}$ is compared to the measurement of the current to be locked $I_{mes}$. The difference E between the current set point $I_{ref}$ and the measurement of the current to be locked $I_{mes}$ determined by the subtractor 601 is amplified by the amplifier 602 of gain G to provide an amplified difference Ea (the gain G may be a combination of proportional, integral and derivative gain). The amplified error Ea is compared to a carrier, typically a triangular or sawtooth signal of amplitude A, in order to produce a PWM signal with pulse width modulated by the amplified error (α is used to denote the duty cycle of the PWM signal). The switches of the four-quadrant bridge are controlled by this PWM signal (or by the signal complementing the PWM signal) by observing a dead time between the closure and the opening of the switches of one and the same leg. A voltage $V_L$ chopped at the carrier frequency is therefore applied to the load 605. The mean voltage $\hat{V}_L$ applied to the load 605 directly depends on the duty cycle α. The current $I_L$ of the load 605 of inductance L (in which the line resistance is disregarded) integrates this voltage. The current in the load can thus increase or decrease in a reverse reaction to the deviation of the current or the variation of the set point.

Figure 13:
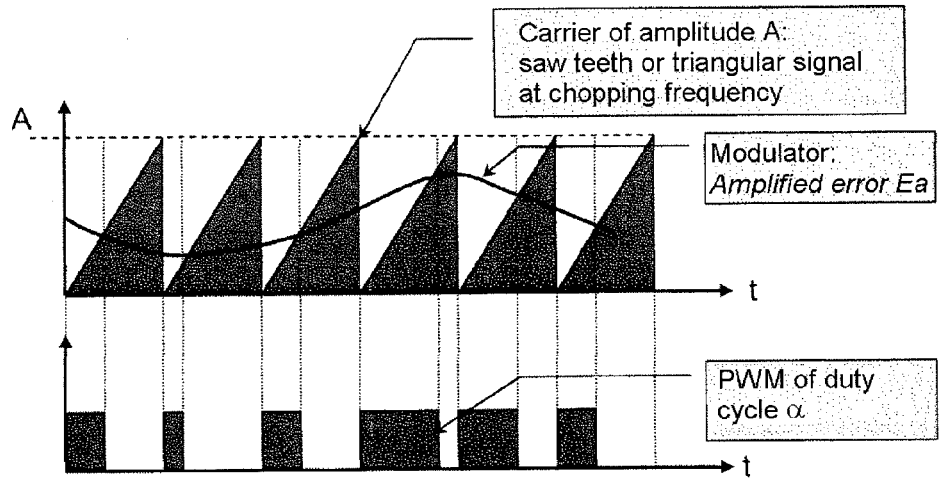
FIG. 13 illustrates the construction of a pulse width modulation signal used, constructed according to the regulation loop of FIG. 12.

FIG. 13 illustrates the construction of a PWM signal of duty cycle α constructed according to the regulation loop of FIG. 12. The PWM signal is therefore constructed from the comparison between a carrier of amplitude A (in this case a sawtooth signal, but it may also be a triangular signal) and the useful signal (modulator) represented by the amplified error Ea. The carrier is used to set the chopping frequency. The PWM signal which forms the control set point for the bridge 604 presents a positive pulse as long as the modulator is above the carrier and zero otherwise. The PWM signal is a fixed reference signal (carrier signal) of which the pulse length depends on the error: it is the duty cycle of the PWM signal that makes it possible to control the current in the load. This duty cycle has the value α=Ea/A (i.e., the generator 603 applies a gain 1/A to the amplified error Ea in order to obtain the duty cycle α).

Figure 14:
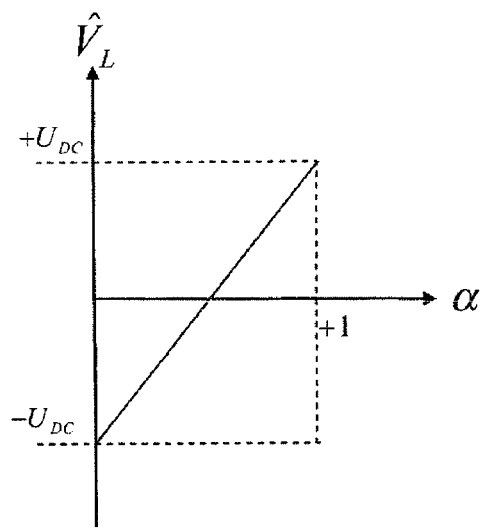
FIG. 14 represents the mean voltage observed by the load in the case of the regulation loop of FIG. 12.

Referring to FIG. 3 which illustrates the two magnetization and demagnetization states, a PWM signal of duty cycle α is applied to the switches AL and BH and the signal complementing the PWM signal, of duty cycle 1−α, to the switches AH and BL. Thus, during the magnetization state, the DC voltage $+U_{dc}$ is applied to the load for a duration αT and during the demagnetization state, the DC voltage $-U_{dc}$ is applied to the load for a duration (1−α)T. The mean voltage $\hat{V}_L$ observed by the load 10 is therefore $(2\alpha-1)U_{DC}$. FIG. 14 represents the linear trend of the mean voltage $\hat{V}_L$ observed by the load as a function of the duty cycle α in the case of a two-state regulation loop such as that represented in FIG. 12.

Having reviewed the prior art with regard to a two-state regulation loop, we will now describe, hereinbelow, with reference to FIG. 15, a first embodiment of a regulation loop 700 enabling a four-state control circuit according to the invention to be implemented.

The regulation loop 700 comprises:
  a subtractor 701;
  an amplifier 702;
  a generator 703 of PWM (pulse width modulation) signals having a duty cycle α;
  a four-quadrant bridge in its positive alternation state 705 or in its negative alternation state 706 intended to supply a chopped voltage to a load (generally an inductive load) 707, of which the measured current $I_{mes}$ forms the current to be locked by said loop 700;
  control means 708 for changing between the positive alternation 705 and the negative alternation 706.

The regulation loop 700 operates as follows: a current set point $I_{ref}$ is compared to the measurement of the current to be locked $I_{mes}$. The difference E between the current set point $I_{ref}$ and the measurement of the current to be locked $I_{mes}$ determined by the subtractor 701 is amplified by the amplifier 702 of gain G to supply an amplified difference Ea (the gain G may be a combination of proportional, integral and derivative gain). The amplified error Ea is compared to a carrier, typically a triangular or sawtooth signal of amplitude A, in order to produce, via the generator 703, a PWM signal with the pulse width modulated by the amplified error (α denotes the duty cycle of the PWM signal). It may also be noted that, as in a conventional PWM control, the control of the quadrant bridge is a function of the error between the current set point and the current measurement. The difference lies in the PWM function, the bridge state depending on the sign which is determined from the PWM signal.

Figure 16:
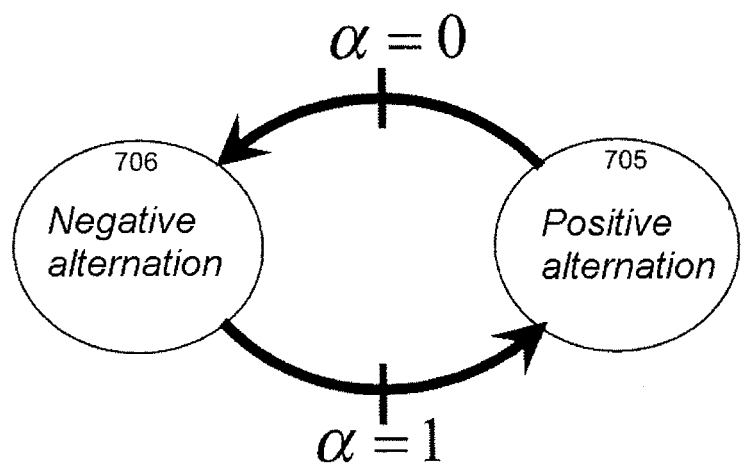
FIG. 16 represents a state machine for implementing the regulation loop according to FIG. 15.

In practice, the control means 708 for changing between the positive alternation 705 and the negative alternation 706 implements the following state machine (illustrated in FIG. 16):
  When the bridge is in its positive alternation 705 and the duty cycle is cancelled, the machine detects a change in state and switches to negative alternation: the sign leg switches over.
  When the bridge is in its negative alternation 706 and the duty cycle is equal to 1, the machine detects a change of state and switches to positive alternation: the sign leg switches over.

Referring to FIG. 8, the PWM signal of duty cycle α is applied to the switch AL and the complementing PWM signal of duty cycle (1−α) is applied to the switch AH both during the positive and negative alternations. When the bridge is in its positive alternation and the duty cycle is cancelled, the means 708 control the opening of the switch BH and the closure of the switch BL. Conversely, when the bridge is in its positive alternation and the duty cycle is cancelled, the means 708 control the opening of the switch BL and the closure of the switch BH.

Advantageously, the means 708 use a sign signal controlling the sign leg B and enabling said leg to toggle from a positive alternation (positive sign signal) to a negative alternation (a negative sign signal or a zero sign signal can be chosen).

The transfer function of the bridge is calculated according to whether it is in its positive or negative alternation:

Positive alternation

Magnetization state: a voltage +Udc is applied to the load for a duration $\alpha T$ (in which T represents the period of the PWM signal);

High freewheeling state: a zero voltage which is applied to the load for a duration $(1-\alpha)T$.

Consequently, the means voltage observed by the load is $\hat{V}_L = \alpha U_{DC}$ during the positive alternation.

Negative alternation

Demagnetization state: a voltage −Udc is applied to the load for a duration $(1-\alpha)T$;

Low freewheeling state: a zero voltage which is applied to the load for a duration $\alpha T$.

Consequently, the mean voltage observed by the load is $\hat{V}_L = -(1-\alpha)U_{DC}$ during the negative alternation.

In other words, the control circuit according to this embodiment of the invention comprises:

means for applying a mean voltage to the load that is equal to the product $\alpha \times U_{DC}$ during the positive alternation 705;

means for applying a mean voltage to the load that is equal to $(\alpha-1) \times U_{DC}$ during the negative alternation 706.

Figure 15:
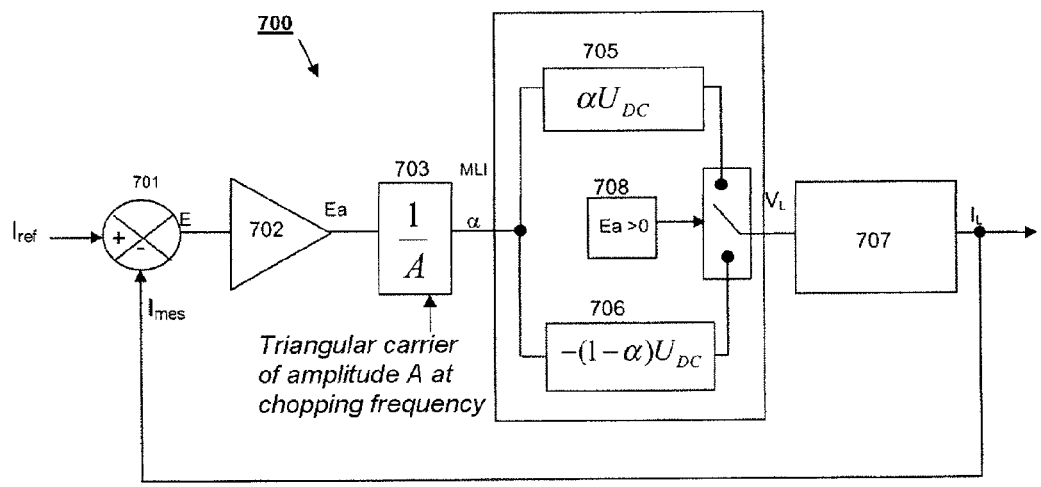
FIG. 15 illustrates a first embodiment of a regulation loop used in a four-state control circuit according to the invention.
Figure 17:
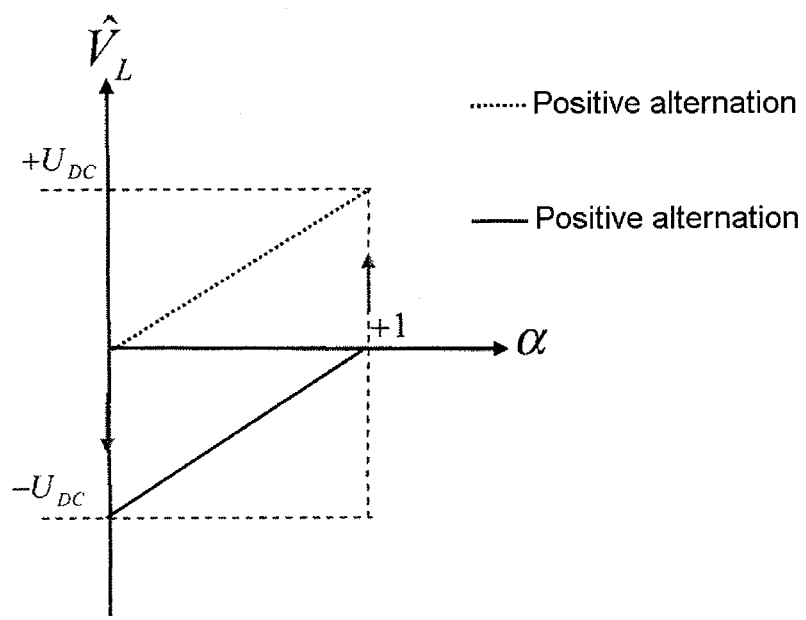
FIG. 17 represents the mean voltage observed by the load in the case of the regulation loop of FIG. 15.

FIG. 17 represents the transfer function of the four-quadrant bridge, that is to say the mean voltage $\hat{V}_L$ observed by the load according to the duty cycle $\alpha$ in the case of a two-state regulation loop such as that represented in FIG. 15. The linear behavior of the mean voltage can be clearly observed in each of the alternations, as can the switchover from one alternation to the other (either when the duty cycle is cancelled when the control circuit is in a positive alternation or when the duty cycle is equal to 1 when the control circuit is in a negative alternation).

FIGS. 18 to 21 represent the measured current $I_{mes}$, the current set point $I_{ref}$, the PWM signal of duty cycle $\alpha$, the sign signal enabling the sign leg B to toggle from a positive alternation (positive sign signal) to a negative alternation (negative sign signal) and the voltage $V_L$ at the terminals of the load as a function of time in different configurations.

Figure 18:
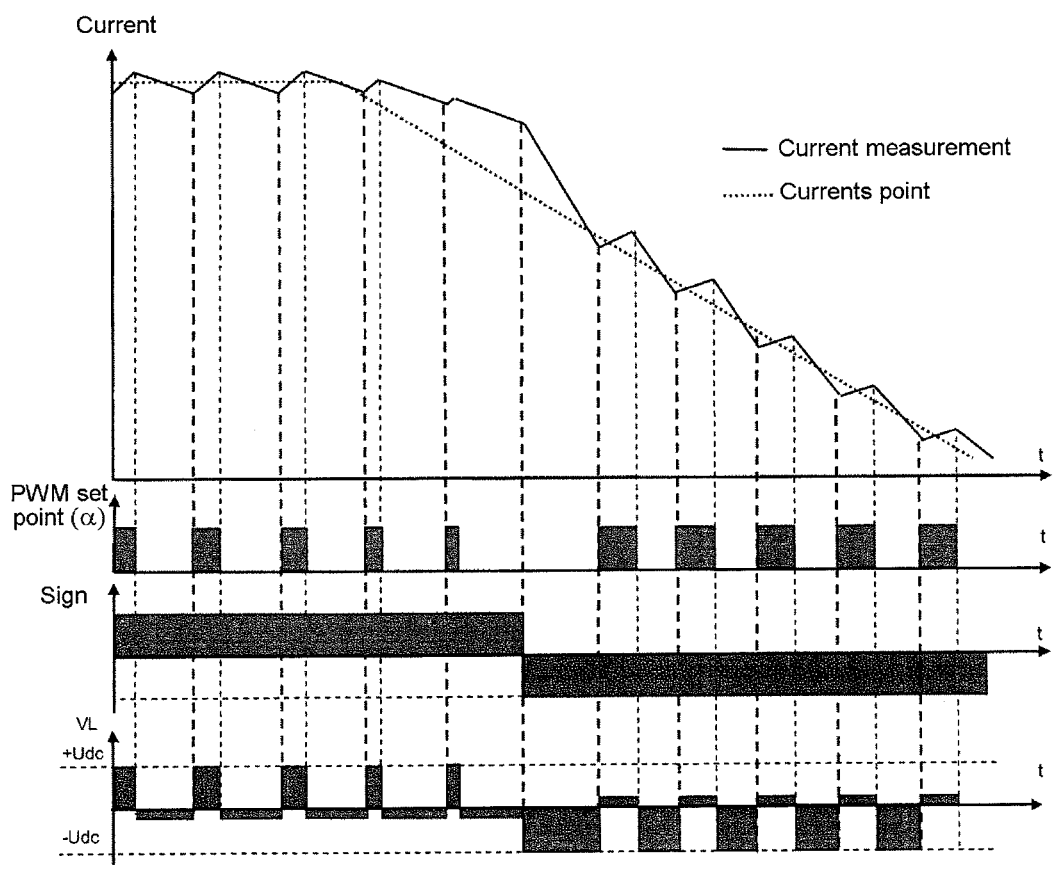
FIGS. 18 to 21 represent the measured current, the current set point, the PWM signal, the sign signal and the voltage across the terminals of the load as a function of time in different configurations of the regulation loop according to FIG. 15.

Referring to FIG. 18, when the current set point drops suddenly, the difference between the set point and the measurement increases. This difference is negative. The error is amplified. The duty cycle of the PWM signal reduces in proportion to the error up to its minimum value (0%). Since the sign signal is initially positive (positive alternation), and since the duty cycle is zero, the state machine detects a change of state. The sign signal switches over and becomes negative. The transfer function of FIG. 17 tells us that, for a zero duty cycle and a negative sign, the mean voltage applied to the inductive load is negative and its amplitude is maximum. The measured current decreases rapidly to converge toward the set point. As the measured current approaches the set point, the error decreases and the duty cycle increases, which causes the amplitude of the voltage to decrease.

Figure 19:
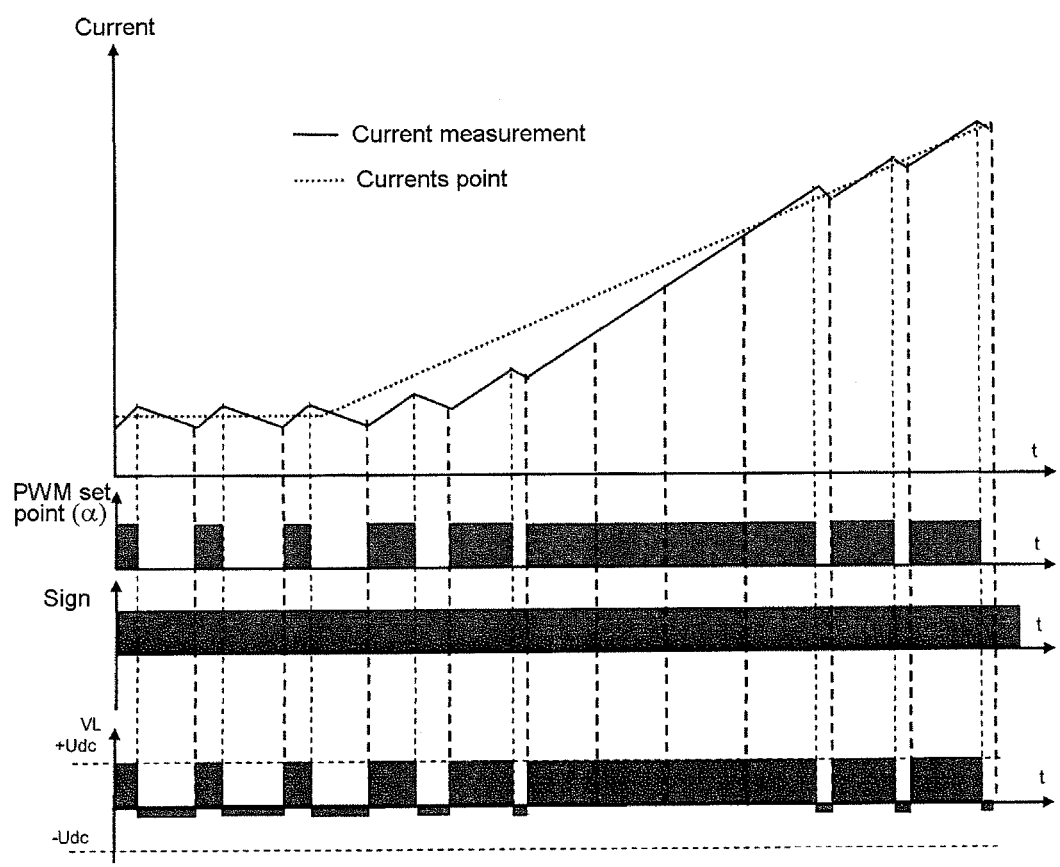

Referring to FIG. 19, when the current set point rises suddenly, the difference between the set point and the measurement increases. This difference is positive. The error is amplified. The duty cycle increases in proportion to the amplified error and reaches its maximum value. Since the sign signal is initially positive (positive alternation) and since the duty cycle is maximum, the state machine does not detect any change of state. The voltage applied to the load thus reaches its maximum which enables the current to converge toward the set point. The amplified error decreases as the measured current approaches the set point.

Figure 20:
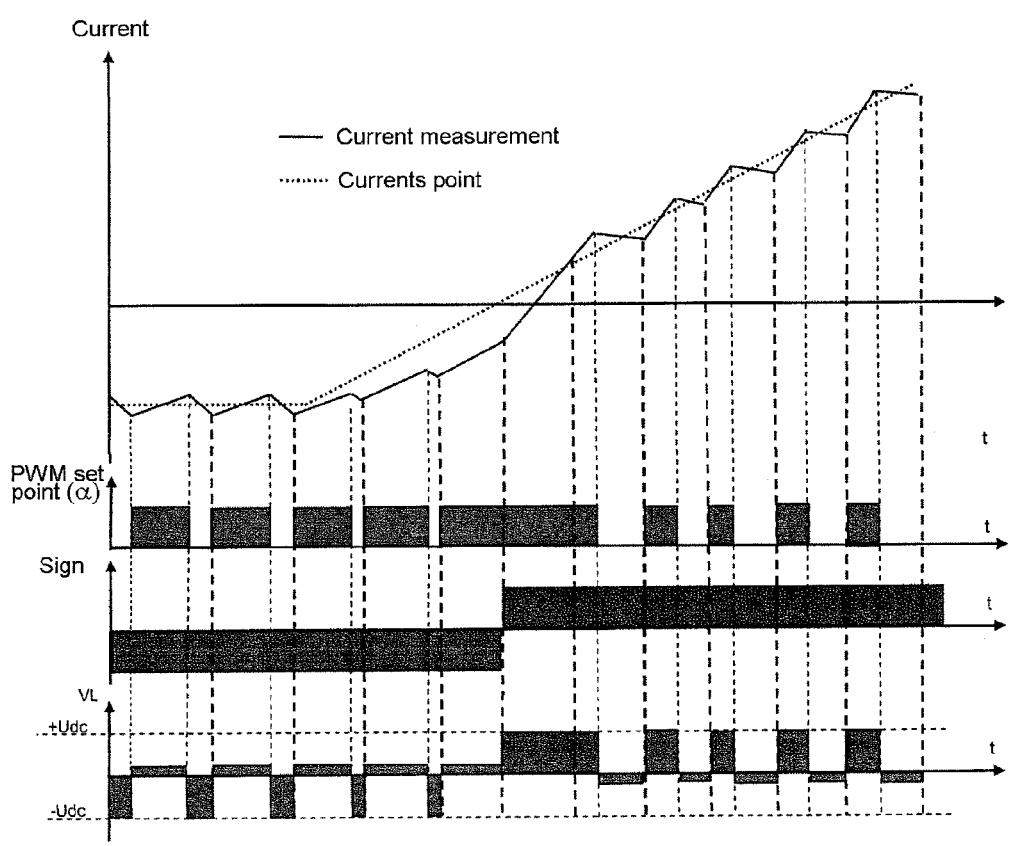

Referring to FIG. 20, when the set point rises suddenly, the difference between the set point and the measurement increases. This difference is positive. The error is amplified. The duty cycle increases in proportion to the error and reaches its maximum value. The state machine detects that the duty cycle is maximum (100%) whereas the sign signal was initially negative. The sign signal switches over and becomes positive. The transfer function of the four-quadrant bridge of FIG. 17 indicates a positive voltage of maximum amplitude. This voltage enables the measured current to increase and catch up with the set point. As the current approaches the set point, the error decreases and consequently the duty cycle decreases.

Figure 21:
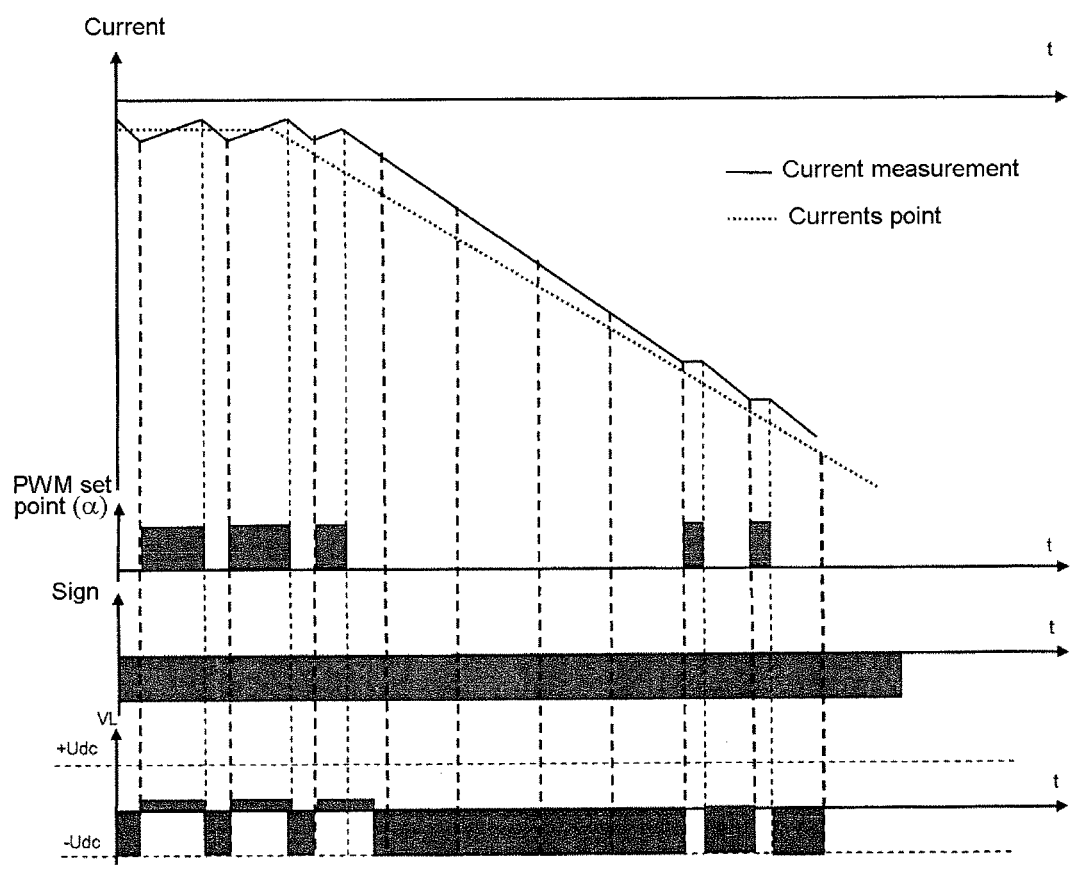

Referring to FIG. 21, when the set point decreases suddenly, the difference between the set point and the measurement increases. This difference is negative. The error is amplified. The duty cycle decreases in proportion to the amplified error and reaches its minimum value. Since the sign signal is initially negative, the state machine does not detect any change. The transfer function of the four-quadrant bridge indicates a mean voltage applied that is negative, of which the amplitude is proportional to the error. The amplitude of the negative voltage across the terminals of the inductive load will be maximum which causes the current to rapidly decrease. As the measured current approaches the set point, the error decreases and the duty cycle increases once again. The voltage applied to the load also reaches its maximum which enables the current to converge toward the set point. The amplified error decreases as the measured current approaches the set point. In this example, there is no change of sign.

In the case of the solution described with reference to FIGS. 15 to 21, the static error is different between the positive alternation and the negative alternation. Thus, to generate one and the same mean voltage $\hat{V}_L$ across the terminals of the load, the errors will be different in the two alternation cases. In the positive alternation case:

$$\alpha = \frac{\hat{V}_L}{U_{DC}} \Rightarrow E_a^+ = A \frac{\hat{V}_L}{U_{DC}}$$

in which $E_a^+$ designates the amplified error in the positive alternation case.

In the negative alternation case:

$$\alpha = 1 + \frac{\hat{V}_L}{U_{DC}} \Rightarrow E_a^- = A\left(1 + \frac{\hat{V}_L}{U_{DC}}\right)$$

in which $E_a^-$ designates the amplified error in the negative alternation case.

The ratio of the errors is therefore $$\frac{E_a^-}{E_a^+} = \frac{U_{DC} + \hat{V}_L}{\hat{V}_L}.$$

The negative static error can therefore be greater than the positive static error. For example, if the power supply voltage is 49 V and 1 V is set at the terminals of the load, the ratio is 50. This leads to discontinuities in the regulation. From then on, a desynchronization of the current during the transition between alternations is likely to occur. This major static error may, however, be offset by an increase in the static gain.

Figure 22:
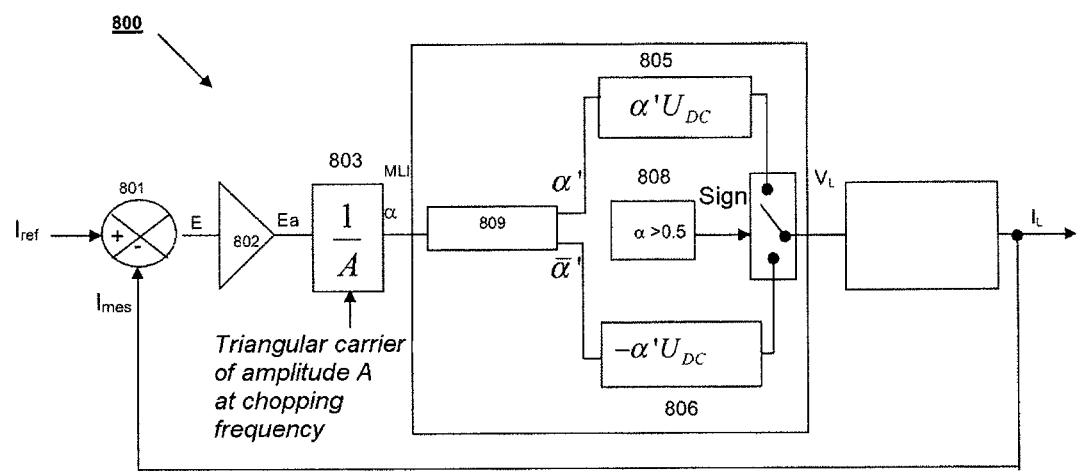
FIG. 22 illustrates a second embodiment of a regulation loop used in a four-state control circuit according to the invention.

FIG. 22 illustrates a second embodiment of a regulation loop 800 for implementing a four-state control circuit according to the invention and for obviating this static error problem.

The regulation loop 800 comprises:
- a subtractor 801;
- an amplifier 802;
- a generator 803 of PWM (pulse width modulation) signals having a duty cycle α;
- a converter 809 for converting the PWM signal of duty cycle α into a PWM signal of duty cycle α' (and for supplying the PWM signal of duty cycle $\overline{\alpha}$' complementing the PWM signal of duty cycle α');
- a four-quadrant bridge in its positive alternation state 805 or in its negative alternation state 806 intended to supply a chopped voltage to a load (generally an inductive load) 807, the measured current $I_{mes}$ of which forms the current to be locked by said loop 800;
- control means 808 for switching between the positive alternation 805 and the negative alternation 806.

The regulation loop 800 operates as follows: a current set point $I_{ref}$ is compared to the measurement of the current to be locked $I_{mes}$. The difference E between the current set point $I_{ref}$ and the measurement of the current to be locked $I_{mes}$ determined by the subtractor 801 is amplified by the amplifier 802 of gain G to supply an amplified difference Ea (the gain G may be a combination of proportional, integral and derivative gain). The amplified error Ea is compared to a carrier, typically a triangular or sawtooth signal of amplitude A, in order to produce, via the generator 803, a PWM signal whose pulse width is modulated by the amplified error (α denotes the duty cycle of the PWM signal).

The PWM signal of duty cycle α is converted by the converter 809 to obtain another PWM signal of the same frequency whose duty cycle α' is equal to |2α−1|.

The converter 809 comprises, for example, means for carrying out the subtraction between a PWM signal of 50% duty cycle and the PWM signal of duty cycle α. The PWM signal obtained has a duty cycle $$\left| \alpha - \frac{1}{2} \right|.$$

Figure 23:
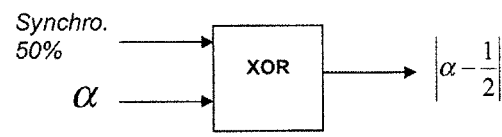
FIG. 23 represents an embodiment of the subtraction means used in the regulation loop of FIG. 22.

This subtraction can be obtained by an exclusive OR logic function as illustrated in FIG. 23. The inputs of the exclusive OR function are respectively the synchronization PWM signal having a duty cycle of 50% and the PWM signal of duty cycle α, and the PWM signal of duty cycle $$\left| \alpha - \frac{1}{2} \right|$$

is obtained directly at the output.

The converter 809 also comprises means for doubling the PWM signal of duty cycle $$\left| \alpha - \frac{1}{2} \right|;$$

in other words, the resultant signal is a PWM signal whose pulse width is two times greater. The duty cycle is therefore |2α−1|. Finally, the converter 809 converts a PWM signal of duty cycle α into a PWM signal of the same frequency of duty cycle α'=|2α−1|.

Figure 24:
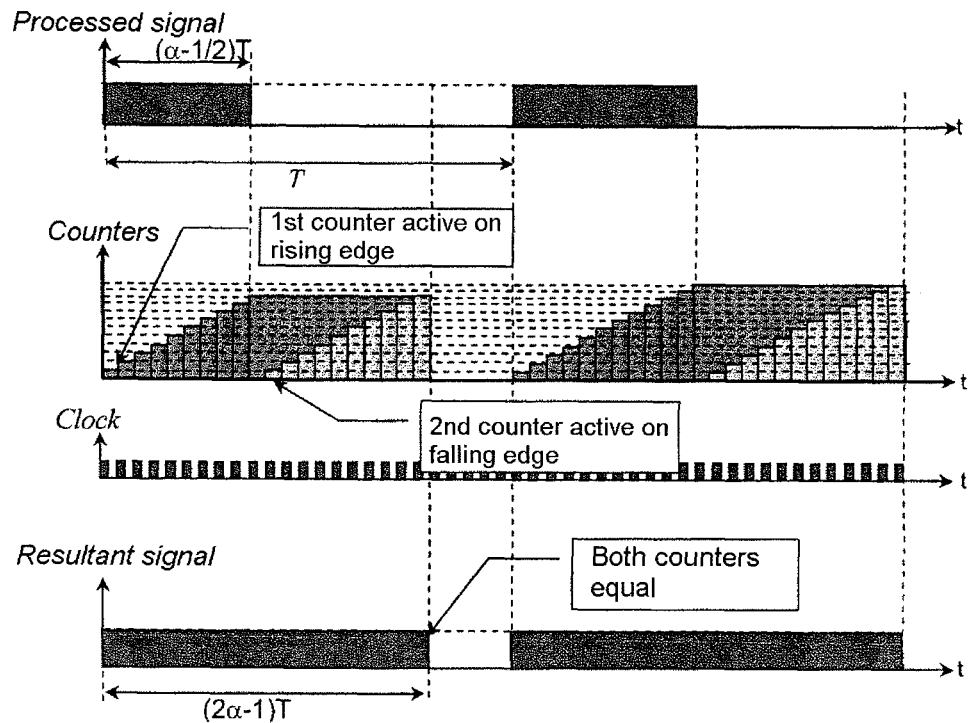
FIG. 24 represents an embodiment of the doubling means used in the regulation loop of FIG. 22.

These means used to double the PWM signal may be implemented using two counters. The use of these counters is illustrated in FIG. 24.

Starting from a processed signal of duty cycle (α−1/2), on the rising edge of the processed signal, the resultant signal (doubled signal) changes to the high state and a first counter, paced by a clock, is incremented during the pulse width and then stops. On the falling edge, a second counter is incremented (paced by the same clock as the first counter): when the value of this second counter is equal to the value of the first counter, the resultant signal is cancelled. The resultant signal has a pulse width two times greater than the pulse width of the processed signal.

Figure 25:
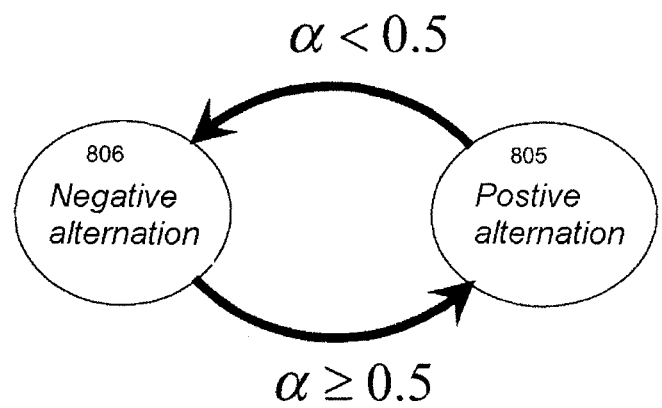
FIG. 25 represents a state machine for implementing the regulation loop according to FIG. 22.

The control means 808 for switching between the positive alternation 805 and the negative alternation 806 implement the following state machine (illustrated in FIG. 25):

When the bridge is in its positive alternation 805 and the duty cycle α is strictly less than 50%, the machine detects a change of state and switches to negative alternation: the sign leg switches over.

When the bridge is in its negative alternation 806 and the duty cycle α is greater than or equal to 50%, the machine detects a change of state and switches to positive alternation: the sign leg switches over.

Referring to FIG. 8, during the positive alternation (α is greater than or equal to 50%), the PWM signal of duty cycle α' is applied to the switch AL and the complementary PWM signal of duty cycle (1−α') is applied to the switch AH.

During the negative alternation (α is strictly less than 50%), the PWM signal of duty cycle 1−α' is applied to the switch AL and the complementary PWM signal of duty cycle α' is applied to the switch AH.

When the bridge is in its positive alternation and the duty cycle α is strictly less than 50%, the means 808 control the opening of the switch BH and the closure of the switch BL. Conversely, when the bridge is in its positive alternation and the duty cycle α is greater than or equal to 50%, the means 808 control the opening of the switch BL and the closure of the switch BH.

Advantageously, the means 808 use a sign signal for controlling the sign leg B by enabling said leg to toggle from a positive alternation (positive sign signal) to a negative alternation (a negative sign signal or a zero sign signal can be chosen).

The transfer function of the bridge is calculated according to whether it is in its positive or negative alternation:

Positive alternation:
  Magnetization state: the bus voltage +Udc is applied to the load for a duration α'T;
  High freewheeling state: a zero voltage is applied to the load for a duration (1−α')T;
  Consequently, the mean voltage observed by the load is $\hat{V}_L = \alpha' U_{DC} = (2\alpha-1)U_{DC}$;

Negative alternation:
  Magnetization state: the bus voltage −Udc is applied to the load for a duration (1−2α)T;
  Low freewheeling state: a zero voltage is applied to the load for a duration 2αT;
  Consequently, the mean voltage observed by the load is $\hat{V}_L = -(1-2\alpha)U_{DC} = (2\alpha-1)U_{DC}$ In other words, the control circuit according to this embodiment of the invention comprises means for applying a mean voltage equal to the product $(2\alpha-1) \times U_{DC}$ to the load during the positive alternation 805 and during the negative alternation 806.

Figure 26:
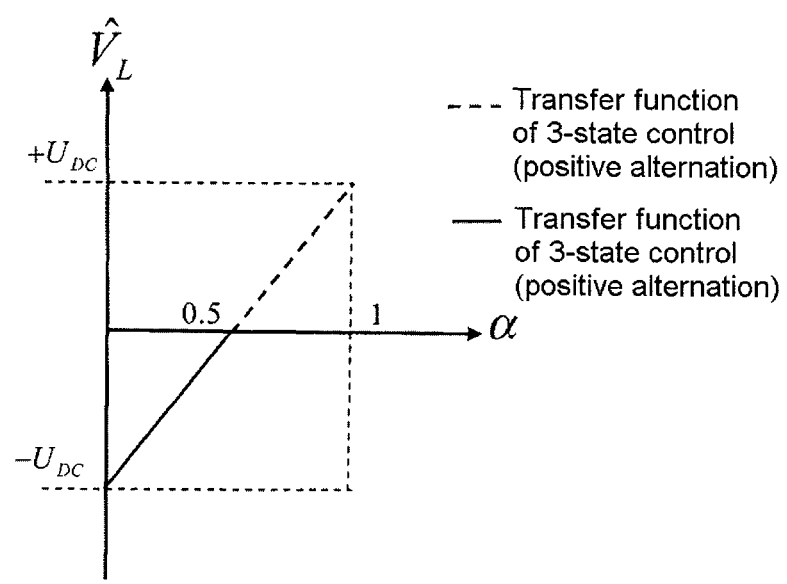
FIG. 26 represents the mean voltage observed by the load in the case of the regulation loop of FIG. 22.

FIG. 26 illustrates the transfer function of the four-quadrant bridge, that is to say the mean voltage $\hat{V}_L$ observed by the load according to the duty cycle $\alpha$ in the case of a four-state regulation loop such as that represented in FIG. 22. The linear behavior of the mean voltage can be clearly observed: this transfer function is identical to that of a control for a known two-state four-quadrant bridge apart from the fact that a conversion of the duty cycle has been made. It will easily be understood that, by its symmetry, this transfer function enables the static error problem to be resolved.

Various control means enabling the control strategy (both in the case of the control circuit using a regulation loop according to FIG. 15 and in the case of a control circuit using a regulation loop according to FIG. 22) are, for example, logic means incorporated in an FPGA (field programmable gate array).

Obviously, the invention is not limited to the embodiment that has just been described.

Notably, the invention has been described in the case of an application to an electromagnetic valve actuator, but it applies to any kind of electrical machine controlled by an inductive load such as an electric motor for example.

In the case of an application to an electric machine, said machine may be single-phase or three-phase.

Furthermore, the embodiment described relates to the control of the current in an inductive load but the invention obviously applies to the control of the voltage across the terminals of this same load.

Moreover, we have described an application in which an FPGA is programmed to implement a state machine; it is also possible to implement this state machine by using wired logic.

It will be noted that the invention has been more particularly described in the case of a use of MOSFET transistors; other types of transistors (IGBT for example) can also be used without departing from the framework of the invention.

Finally, any means can be replaced by an equivalent means.

The invention claimed is:

1. A circuit for controlling a current in an electrical control member or a voltage across terminals of said electrical control member, said circuit comprising:
   a bridge provided with four terminals and comprising four control switches;
   a first power source for said bridge; and
   means of controlling at least two of said four switches by pulse width modulation,
   wherein said power source is connected between a first terminal and a second terminal of said bridge, wherein said electrical control member is connected between a third terminal and a fourth terminal of said bridge, wherein the first switch is connected between said first terminal and said third terminal of said bridge, wherein the second switch is connected between said first terminal and said fourth terminal of said bridge, wherein the third switch is connected between said third terminal and said second terminal of said bridge, wherein the fourth switch is connected between said fourth terminal and said second terminal of said bridge, and
   wherein the circuit for controlling the current or the voltage comprises:
   a first state in which said first and fourth switches are closed and said second and third switches are open,
   a second state in which said second and third switches are closed and said first and fourth switches are open, and
   at least one of the following two states:
   a third state in which said third and fourth switches are closed and said first and second switches are open, and
   a fourth state in which said first and second switches are closed and said third and fourth switches are open;
   wherein said means of controlling the at least two switches by pulse width modulation authorizes:
   a transition from said first state to at least one of said third or fourth states, a transition from said second state to at least one of said third or fourth states, a transition from at least one of said third or fourth states to said first state, and a transition from at least one of said third or fourth states to said second state, and
   a first negative alternation phase comprising:
   transitions from said first state to said third state and transitions from said third state to said first state, said first and third switches forming a first amplitude leg, switching at a chopping frequency, and second and fourth transistors forming a second sign leg, wherein the second and fourth transistors are respectively closed and open; and
   a second positive alternation phase comprising:
   transitions from said second state to said fourth state and transitions from said fourth state to said second state, said first and third switches switching at said chopping frequency and said second and fourth switches being respectively open and closed, wherein the switching of said second and fourth switches of said sign leg ensures a transition between said negative and positive alternations at a frequency below said chopping frequency.

2. The circuit for controlling the current or voltage as claimed in claim 1, further comprising a shunt resistor connected in series between said electrical control member and said fourth terminal.

3. The circuit for controlling the current or voltage as claimed in claim 2, further comprising an operational amplifier, wherein terminals of said shunt resistor form inverting and non-inverting inputs of said operational amplifier.

4. The circuit for controlling the current or voltage as claimed in claim 1, further comprising:
   a charge pump capacitor which, when charged, is suitable for delivering a control voltage for said second switch;
   a second power source delivering a voltage less than a voltage delivered by said first power source, wherein said second power source is for charging said charge pump capacitor when said fourth switch is closed;
   means for forcing a transition from said fourth state to said third state when said control circuit is in the positive alternation phase so that said charge pump capacitor is recharged via said second power source.

5. The circuit for controlling the current or voltage as claimed in claim 1, wherein said means for controlling the at least two switches comprise:
   means for generating a pulse width modulation signal having a duty cycle $\alpha$;
   means for applying said pulse width modulation signal having a duty cycle $\alpha$ to a third transistor and a pulse width modulation signal having a duty cycle $1-\alpha$ to a first transistor;

means for passing between the positive alternation and the negative alternation using a state machine:
when said bridge is in the positive alternation and the duty cycle α is cancelled, the state machine detects a change of state and changes to the negative alternation, when said bridge is in the negative alternation and the duty cycle α is equal to 100%, the state machine detects a change of state and changes to the positive alternation.

6. The circuit for controlling the current or voltage as claimed in claim 5, wherein said first power source delivers a DC voltage +U.sub.DC, and wherein said circuit for controlling the current or voltage comprises: means for applying an average voltage equal to a product of the duty cycle α and the DC voltage delivered by the power source, α×ub.DC, to said electrical control member during said positive alternation; means for applying an average voltage equal to a product of the duty cycle α−1 and the DC voltage, (α−1)×U.sub.DC, to said electrical control member during said negative alternation.

7. The circuit for controlling the current or voltage as claimed in claim 1, wherein said means for controlling the at least two switches comprise:
means for generating a pulse width modulation signal having a duty cycle α;
means for converting said pulse width modulation signal having a duty cycle α into a pulse width modulation signal having a duty cycle α'=|2α−1|;
means for applying said pulse width modulation signal having a duty cycle α' to a third transistor and a pulse width modulation signal having a duty cycle 1−α' to a first transistor during said positive alternation;
means for applying said pulse width modulation signal having a duty cycle 1−α' to said third transistor and a pulse width modulation signal having a duty cycle α' to said first transistor during said negative alternation; and
means for passing between the positive alternation and the negative alternation using a state machine:
when said bridge is in its positive alternation and said duty cycle α is strictly less than 50%, the machine detects a change of state and changes to negative alternation, and
when said bridge is in its negative alternation and said duty cycle α is greater than or equal to 50%, the machine detects a change of state and changes to positive alternation.

8. The circuit for controlling the current or voltage as claimed in claim 7, wherein said first power source delivers a DC voltage +U.sub.DC, and wherein said control circuit comprises means for applying an average voltage equal to a product of (2α−1).times. the DC voltage U.sub.DC to said electrical control member during said positive alternation and during said negative alternation.

9. The circuit for controlling the current or voltage as claimed in claim 7, wherein said means for converting said pulse width modulation signal having a duty cycle α into a pulse width modulation signal having a duty cycle α'=2α−1 comprise:
means for performing a subtraction between a signal of duty cycle equal to 50% and said signal of duty cycle α; and
means for doubling the signal obtained by said subtraction.

10. The circuit for controlling the current or voltage as claimed in claim 9, wherein said means for performing the subtraction between a signal of duty cycle equal to 50% and said signal of duty cycle α are means performing an exclusive OR logic function wherein two inputs of the exclusive OR logic function comprise said signal of duty cycle equal to 50% and said signal of duty cycle α.

11. The circuit for controlling the current or voltage as claimed in claim 9, wherein said means for doubling the signal obtained by said subtraction comprise at least one counter.

12. The circuit for controlling the current or voltage as claimed in claim 1, wherein said control means are included in a programmable logic circuit.

13. The circuit for controlling the current or voltage as claimed in claim 1, wherein said switches are MOSFET transistors.

14. The circuit for controlling the current or voltage as claimed in claim 1, wherein the control circuit is used for an electrical member formed by an inductive load with variable inductance.

15. A circuit for controlling a current in an electrical control member or a voltage across the terminals of said electrical control member, said circuit comprising:
a bridge provided with four terminals and comprising four control switches;
a first power source for said bridge; and
means of controlling at least two of said four switches by pulse width modulation,
wherein said first power source is connected between a first terminal and a second terminal of said bridge, wherein said electrical control member is connected between a third terminal and a fourth terminal of said bridge, wherein the first switch is connected between said first terminal and said third terminal of said bridge, wherein the second switch is connected between said first terminal and said fourth terminal of said bridge, wherein the third switch is connected between said third terminal and said second terminal of said bridge, wherein the fourth switch is connected between said fourth terminal and said second terminal of said bridge, and
wherein the circuit for controlling the current or the voltage comprises:
a first state in which said first and fourth switches are closed and said second and third switches are open,
a second state in which said second and third switches are closed and said first and fourth switches are open, and
at least one of the following two states:
a third state in which said third and fourth switches are closed and said first and second switches are open, and
a fourth state in which said first and second switches are closed and said third and fourth switches are open;
wherein said means of controlling the at least two switches by pulse width modulation authorizes:
a transition from said first state to at least one of said third or fourth states, a transition from said second state to at least one of said third or fourth states, a transition from at least one of said third or fourth states to said first state, and a transition from at least one of said third or fourth states to said second state,
wherein the transition from said first state to at least one of said third or fourth states requires only one switchover, and
wherein the transition from said second state to at least one of said third or fourth states requires only one switchover, and a first negative alternation phase comprising: transitions from said first state to said third state and transitions from said third state to said first state, said first and third switches forming a first amplitude leg, switching at a chopping frequency, and second and fourth transistors forming a second sign leg, wherein the second and fourth transistors are respectively closed and open; and a second positive alternation phase comprising: transitions from said second state to said fourth state and transitions from said fourth state to said second state, said first and third switches switching at said chopping frequency and said second and fourth switches being respectively open and closed, wherein the switching of said second and fourth switches of said sign leg ensures a transition between said negative and positive alternations at a frequency below said chopping frequency.

16. The circuit for controlling the current or voltage as claimed in claim 15, further comprising a shunt resistor connected in series between said electrical control member and said fourth terminal.

17. The circuit for controlling the current or voltage as claimed in claim 15, further comprising:
a charge pump capacitor which, when charged, is suitable for delivering a control voltage for said second switch;
a second power source delivering a voltage less than the voltage delivered by said first power source, wherein said second power source is for charging said charge pump capacitor when said fourth switch is closed; and
means for forcing the transition from said fourth state to said third state when said control circuit is in the positive alternation phase so that said charge pump capacitor is recharged via said second power source.

18. The circuit for controlling the current or voltage as claimed in claim 15, wherein said means for controlling the at least two switches comprise:
means for generating a pulse width modulation signal having a duty cycle α;
means for applying said pulse width modulation signal having a duty cycle α to said third transistor and a pulse width modulation signal having a duty cycle 1−α to said first transistor; and
means for passing between the positive alternation and the negative alternation using a state machine:
when said bridge is in the positive alternation and the duty cycle α is cancelled, the state machine detects a change of state and changes to the negative alternation, and
when said bridge is in the negative alternation and the duty cycle α is equal to 100%, the state machine detects a change of state and changes to the positive alternation.

19. The circuit for controlling the current or voltage as claimed in claim 18, wherein said power source delivers a DC voltage +U.sub.DC, and wherein said circuit for controlling the current or voltage comprises:
means for applying an average voltage equal to a product of the duty cycle α and the DC voltage delivered by the power source, α times U.sub.DC, to said electrical control member during said positive alternation; and
means for applying an average voltage equal to a product of the duty cycle α−1 and the DC voltage, (α−1) times U.sub.DC, to said electrical control member during said negative alternation.

20. The circuit for controlling the current or voltage as claimed in claim 15, wherein said means for controlling the at least two switches comprise:
means for generating a pulse width modulation signal having a duty cycle α;
means for converting said pulse width modulation signal having a duty cycle α into a pulse width modulation signal having a duty cycle α'=|2α−1|;
means for applying said pulse width modulation signal having a duty cycle α' to said third transistor and a pulse width modulation signal having a duty cycle 1−α' to said first transistor during said positive alternation;
means for applying said pulse width modulation signal having a duty cycle 1−α' to said third transistor and a pulse width modulation signal having a duty cycle α' to said first transistor during said negative alternation; and
means for passing between the positive alternation and the negative alternation using a state machine:
when said bridge is in its positive alternation and said duty cycle α is strictly less than 50%, the state machine detects a change of state and changes to the negative alternation, and
when said bridge is in the negative alternation and said duty cycle α is greater than or equal to 50%, the state machine detects a change of state and changes to positive alternation.

21. The circuit for controlling the current or voltage as claimed in claim 20, wherein said power source delivers a DC voltage +U.sub.DC, and wherein said control circuit comprises means for applying an average voltage equal to a product of (2α−1).times. the DC voltage U.sub.DC to said electrical control member during said positive alternation and during said negative alternation.

22. The circuit for controlling the current or voltage as claimed in claim 20, wherein said means for converting said pulse width modulation signal having a duty cycle α into a pulse width modulation signal having a duty cycle α'=2α−1 comprise:
means for performing the subtraction between a signal of duty cycle equal to 50% and said signal of duty cycle α;
means for doubling the signal obtained by said subtraction.

23. The circuit for controlling the current or voltage as claimed in claim 22, wherein said means for performing the subtraction between a signal of duty cycle equal to 50% and said signal of duty cycle α are means performing an exclusive OR logic function wherein two inputs of the exclusive OR logic function comprise said signal of duty cycle equal to 50% and said signal of duty cycle α.

* * * * *